United States Patent
Kim et al.

(10) Patent No.: US 9,746,988 B2
(45) Date of Patent: Aug. 29, 2017

(54) MULTI-SENSOR SURVEILLANCE SYSTEM WITH A COMMON OPERATING PICTURE

(75) Inventors: Kyungnam Kim, Oak Park, CA (US); Yuri Owechko, Newbury Park, CA (US); Arturo Flores, La Jolla, CA (US); Alejandro Nijamkin, Simi Valley, CA (US); Dmitriy V. Korchev, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 1503 days.

(21) Appl. No.: 13/113,295

(22) Filed: May 23, 2011

(65) Prior Publication Data
US 2012/0304085 A1  Nov. 29, 2012

(51) Int. Cl.
G06F 3/0481 (2013.01)
G08B 13/196 (2006.01)
H04N 7/18 (2006.01)

(52) U.S. Cl.
CPC ... *G06F 3/04815* (2013.01); *G08B 13/19641* (2013.01); *G08B 13/19671* (2013.01);
(Continued)

(58) Field of Classification Search
CPC ............. G06T 2200/24; G06T 2200/08; G06T 2207/30232; G06T 3/4038;
(Continued)

(56) References Cited

U.S. PATENT DOCUMENTS 4,819,169 A * 4/1989 Saitoh ................... G06T 7/0042
                                                        180/168
5,168,530 A * 12/1992 Peregrim et al. ............. 382/199
(Continued)

FOREIGN PATENT DOCUMENTS

WO   WO03010728 A1   2/2003
WO   WO2006012645 A2   2/2006

OTHER PUBLICATIONS

Mohedano, Raúl, et al. "Robust 3D people tracking and positioning system in a semi-overlapped multi-camera environment." Image Processing, 2008. ICIP 2008. 15th IEEE International Conference on. IEEE, 2008.*
(Continued)

*Primary Examiner* — Eric Wiener
(74) *Attorney, Agent, or Firm* — Yee & Associaes, P.C.

(57) ABSTRACT

A method and apparatus for processing video data streams for an area. Objects are identified in the area from images in the video data streams. The video data streams are generated by cameras. First locations are identified for the objects using the images. The first locations are defined using a coordinate system for the images. Graphical representations are formed for the objects using the images. The graphical representations are displayed for the objects in second locations in a model of the area on a display system with respect to features in the area that are represented in the model. The second locations are defined using a geographic coordinate system for the model. A first location in the first locations for an object in the objects corresponds to a second location in the second locations for a corresponding graphical representation in the graphical representations.

20 Claims, 14 Drawing Sheets

(52) U.S. Cl.
CPC ....... *G08B 13/19682* (2013.01); *H04N 7/181* (2013.01); *H04N 7/185* (2013.01); *G06T 2207/30196* (2013.01); *G06T 2207/30232* (2013.01)

(58) Field of Classification Search
CPC . G06T 2207/30212; G06T 2207/30196; G06T 7/004; G06T 7/0042; G06T 7/0044; G06T 7/0046; G06T 17/05; G06T 7/2093; G08B 13/19641; G08B 13/19671; G08B 13/1968; G08B 13/19682; G06F 3/04815; G06K 9/00208
See application file for complete search history.

(56) References Cited

U.S. PATENT DOCUMENTS

| | | | | |
|---|---|---|---|---|
| 5,577,181 | A * | 11/1996 | Givens et al. | 382/294 |
| 6,009,190 | A * | 12/1999 | Szeliski et al. | 382/154 |
| 6,018,349 | A * | 1/2000 | Szeliski et al. | 345/629 |
| 6,072,496 | A * | 6/2000 | Guenter et al. | 345/419 |
| 6,084,510 | A | 7/2000 | Lemelson et al. | |
| 6,512,857 | B1 * | 1/2003 | Hsu et al. | 382/294 |
| 6,597,818 | B2 * | 7/2003 | Kumar et al. | 382/294 |
| 6,826,292 | B1 * | 11/2004 | Tao et al. | 382/103 |
| 6,956,573 | B1 * | 10/2005 | Bergen et al. | 345/473 |
| 6,985,172 | B1 * | 1/2006 | Rigney et al. | 348/149 |
| 6,985,620 | B2 * | 1/2006 | Sawhney et al. | 382/154 |
| 7,187,809 | B2 * | 3/2007 | Zhao et al. | 382/285 |
| 7,313,252 | B2 * | 12/2007 | Matei et al. | 382/100 |
| 7,353,114 | B1 * | 4/2008 | Rohlf | G06F 17/2247 702/5 |
| 7,363,157 | B1 * | 4/2008 | Hanna et al. | 702/5 |
| 8,098,888 | B1 * | 1/2012 | Mummareddy et al. | 382/103 |
| 8,289,390 | B2 * | 10/2012 | Aggarwal et al. | 348/143 |
| 8,401,276 | B1 * | 3/2013 | Choe et al. | 382/154 |
| 2002/0094135 | A1 * | 7/2002 | Caspi et al. | 382/294 |
| 2002/0097322 | A1 * | 7/2002 | Monroe | G08B 13/19643 348/159 |
| 2003/0014224 | A1 * | 1/2003 | Guo et al. | 703/1 |
| 2003/0085992 | A1 * | 5/2003 | Arpa et al. | 348/47 |
| 2003/0218674 | A1 * | 11/2003 | Zhao et al. | 348/140 |
| 2004/0017931 | A1 * | 1/2004 | Knox | G06T 7/20 382/104 |
| 2004/0071367 | A1 * | 4/2004 | Irani et al. | 382/284 |
| 2004/0130620 | A1 * | 7/2004 | Buehler et al. | 348/143 |
| 2006/0077255 | A1 | 4/2006 | Cheng | |
| 2006/0187305 | A1 * | 8/2006 | Trivedi et al. | 348/169 |
| 2007/0052803 | A1 * | 3/2007 | Chosak et al. | 348/143 |
| 2008/0060034 | A1 | 3/2008 | Egnal et al. | |
| 2008/0117294 | A1 | 5/2008 | McCutchen | |
| 2008/0129581 | A1 * | 6/2008 | Douglass et al. | 342/52 |
| 2008/0292180 | A1 * | 11/2008 | Kobayashi et al. | 382/154 |
| 2008/0298672 | A1 * | 12/2008 | Wallack et al. | 382/154 |
| 2009/0086020 | A1 * | 4/2009 | Westrick et al. | 348/140 |
| 2009/0097710 | A1 * | 4/2009 | Sroka et al. | 382/103 |
| 2009/0110267 | A1 * | 4/2009 | Zakhor et al. | 382/154 |
| 2009/0135191 | A1 * | 5/2009 | Azar et al. | 345/522 |
| 2009/0278973 | A1 * | 11/2009 | Sogoh | H04N 1/00323 348/333.02 |
| 2009/0284551 | A1 * | 11/2009 | Stanton | G06F 3/14 345/629 |
| 2009/0322742 | A1 * | 12/2009 | Muktinutalapati et al. | 345/420 |
| 2010/0001998 | A1 * | 1/2010 | Mandella | G01B 11/002 345/419 |
| 2010/0073487 | A1 * | 3/2010 | Sogoh | G06T 17/05 348/207.1 |
| 2010/0092079 | A1 * | 4/2010 | Aller | G06K 9/3216 382/165 |
| 2010/0097475 | A1 * | 4/2010 | Yokomitsu | 348/169 |
| 2010/0118116 | A1 * | 5/2010 | Tomasz | G01C 11/02 348/36 |
| 2010/0157056 | A1 * | 6/2010 | Zohar et al. | 348/144 |
| 2010/0231721 | A1 * | 9/2010 | Meloche et al. | 348/159 |
| 2010/0238161 | A1 * | 9/2010 | Varga et al. | 345/419 |
| 2012/0257792 | A1 * | 10/2012 | Simon | 382/103 |
| 2013/0034266 | A1 * | 2/2013 | Shamir et al. | 382/103 |

OTHER PUBLICATIONS

"TerraSight 3D Visualizer Demo." SRI International Sarnoff. YouTube video uploaded Feb. 25, 2010. Duration: 0:10. URL: https://www.youtube.com/watch?v=rZ6IZpWiEcl.*
"TerraSight Persistent Surveillance Common Operating Picture." SRI International Sarnoff. YouTube video uploaded Feb. 25, 2010. Duration: 1:53. URL: https://www.youtube.com/watch?v=YUUrIBpx-Ls.*
Rasheed, Zeeshan, et al. "Automated visual analysis in large scale sensor networks." Distributed Smart Cameras, 2008. ICDSC 2008. Second ACM/IEEE International Conference on. IEEE, 2008.*
Sebe, Ismail Oner, et al. "3d video surveillance with augmented virtual environments." First ACM SIGMM international workshop on Video surveillance. ACM, 2003.*
Lipton, Alan, et al. A system for video surveillance and monitoring. vol. 2. Pittsburg: Carnegie Mellon University, the Robotics Institute, 2000.*
Lin, Yuping, and Gérard Medioni. "Map-enhanced UAV image sequence registration and synchronization of multiple image sequences." Computer Vision and Pattern Recognition, 2007. CVPR'07. IEEE Conference on. IEEE, 2007.*
Se, Stephen, et al. "Automated UAV-based mapping for airborne reconnaissance and video exploitation." SPIE Defense, Security, and Sensing. International Society for Optics and Photonics, 2009.*
Wang et al., "Sensor Fusion Method Using GPS/IMU Data for East UAV Surveillance Video Frame Registration", IEEE, 2009, pp. 985-988.
Lin et al., "Map-Enhanced UAV Image Sequence Registration", IEEE, 2007, 6 pages.
Chandaria et al., "The MATRIS project: real-time markerless camera tracking for Augmented Reality and broadcast applications", Springer-Verlag, Jun. 4, 2007, pp. 69-79.
Pluim et al., "Mutual information based registration of medical images: a survey", IEEE Transactions on Medical Imaging, 2003, pp. 1-21.
Hol et al., "Relative Pose Calibration of a Spherical Camera and an IMU", IEEE International Symposium on Mixed and Augmented Reality, Sep. 15-18, 2008, Cambridge, UK, pp. 21-24.
Thompson, "Pursuing Multisensor GUI Advances", Air force Print News Today, Jun. 15, 2010, 1 page.
"BAE Systems Completes First Flight Test of Persistent Surveillance System to Protect U.S. Army Soldiers", Feb. 8, 2010, BAE Systems News Release, pp. 1-2.
"Convene", pp. 1-2, retrieved May 6, 2011 www.echostorm.net/convene.html.
"MultiPlayer", EchoStorm Worldwide, pp. 1-2, retrieved May 6, 2011 www.echostorm.net.
Hambling, "Military Video System Is Like YouTube With Artillery", Nov. 20, 2009, Wired.com, pp. 1-3.
"Persistent Threat Detection System (PTDS)", pp. 1-2, retrieved May 6, 2011 www.lockheedmartin.com/.../index.html.
"GPS/Inertial Products InterNav Modular GPS / Inertial Software", pp. 1-4, retrieved May 6, 2011 www.navsys.com/Products/internav.htm.
"GPS/Inertial Products GI-Eye Precision Georegistration and Remote Sensing System", pp. 1-4, retrieved May 6, 2011 www.navsys.com/Products/gi-eye.htm.
Brown et al., "Flight Ttest Results of a Video-Aided GPS/Inertial Navigation System", Proceedings of ION GNSS 2007, Ft. Worth, TX, Sep. 2007, pp. 1-7.
"TerraSight Video Exploitation", SRI International Sarnoff, pp. 1-8, retrieved May 23, 2011, www.sarnoff.com/files/terrasight_brochure.pdf.
EP search report dated Jul. 2, 2012 regarding application 12160213.

(56) References Cited

OTHER PUBLICATIONS 0-2215, applicant The Boeing Company, reference NAM/P121212EP00, 5 Pages.

* cited by examiner

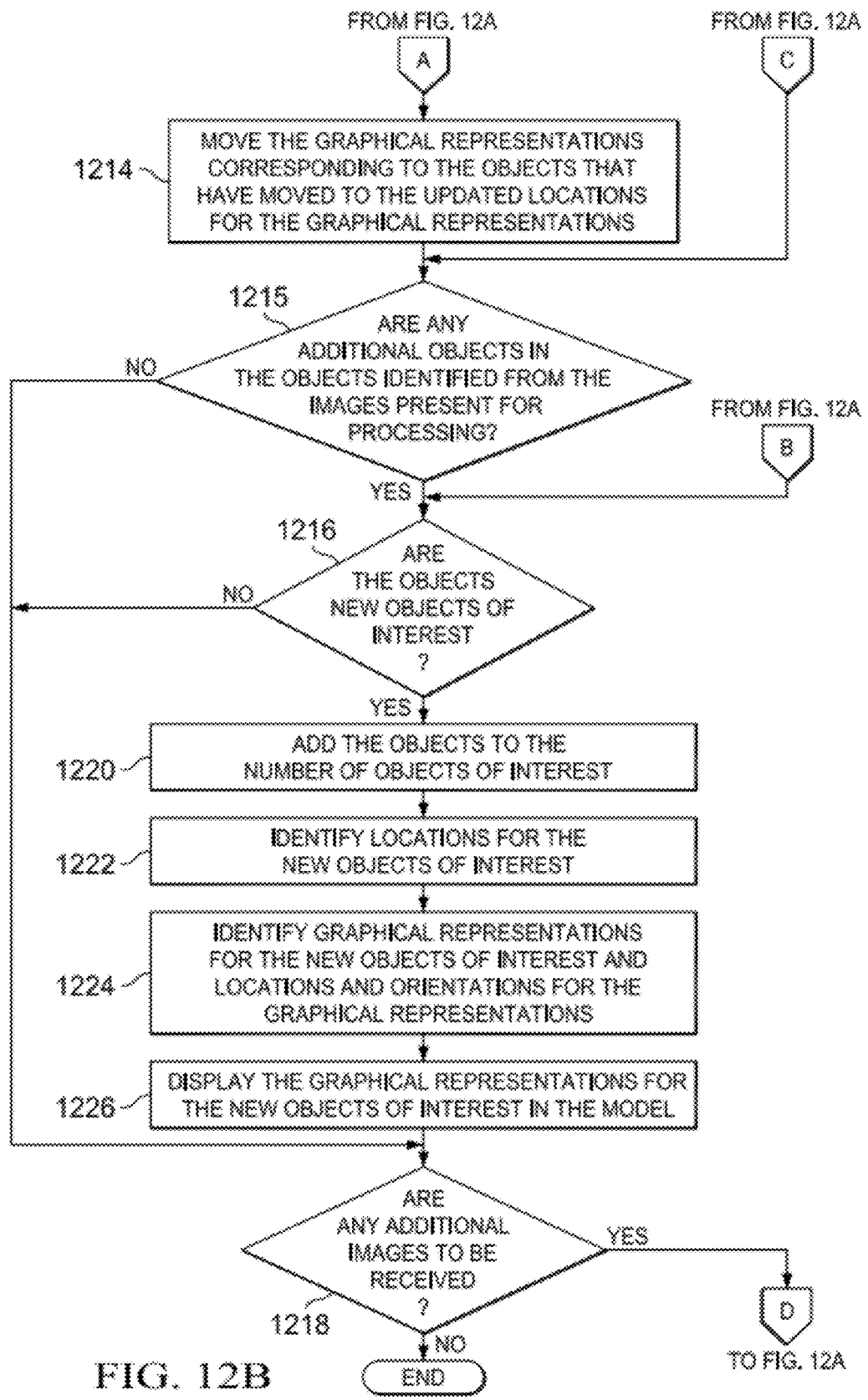

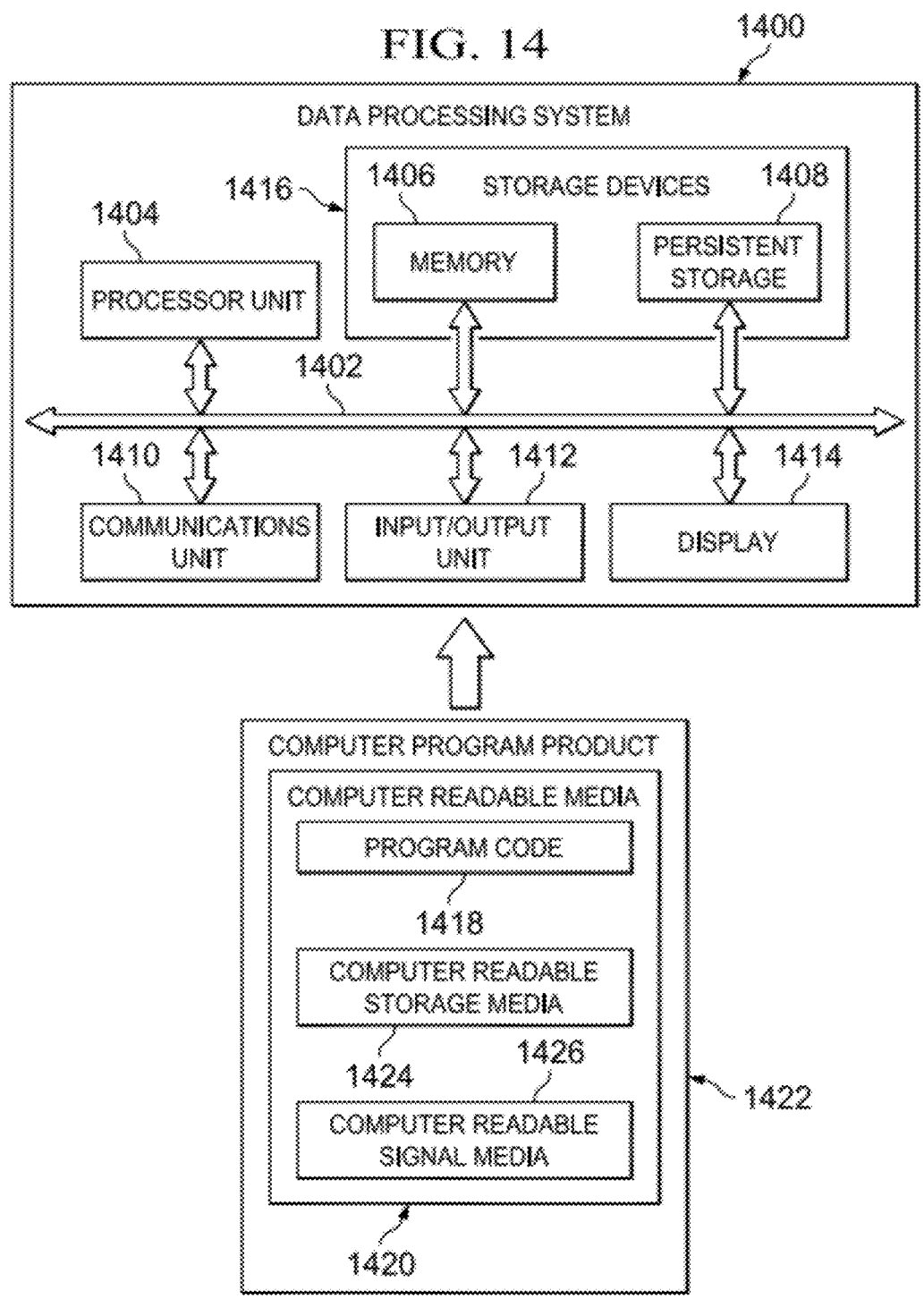

MULTI-SENSOR SURVEILLANCE SYSTEM WITH A COMMON OPERATING PICTURE

BACKGROUND INFORMATION

1. Field

The present disclosure relates generally to surveillance systems and, in particular, to surveillance systems that generate multiple video streams. Still more particularly, the present disclosure relates to a method and apparatus for processing multiple video streams for an area.

2. Background

Aircraft are often used to perform surveillance of various locations. For example, an aircraft may be used to obtain information about the movement of people, pipelines, buildings, and/or other types of objects. Oftentimes, unmanned aerial vehicles (UAVs) are used for performing surveillance. An unmanned aerial vehicle may carry a camera system and other types of sensors. The camera system may include one or more cameras.

The unmanned aerial vehicle may be pre-programmed to move over particular areas or to follow selected moving objects. Other unmanned aerial vehicles may be controlled by an operator at another location. The operator may view the images from the camera system to provide further input to control movement of the unmanned aerial vehicle.

One type of surveillance that is performed using an unmanned aerial vehicle is persistent surveillance. With persistent surveillance, multiple unmanned aerial vehicles may be used to cover a particular area or object. Unmanned aerial vehicles may monitor an area to detect, identify, track, and/or provide other information about objects that may be present in that area. This type of persistent surveillance also may include following an object that has been identified that moves out of the particular area that is being monitored.

This type of surveillance may require more unmanned aerial vehicles than desired when the camera systems in these vehicles only include a single camera. As a result, unmanned aerial vehicles often include camera systems that may have 12, 30, 92, or some other number of cameras. In this manner, a single unmanned aerial vehicle may provide many video data streams for use in performing surveillance.

One issue with these types of camera systems occurs when the unmanned aerial vehicles are remotely operated by a human operator. A single human operator may be unable to look at the video data on the monitor and identify needed information to redirect the unmanned aerial vehicle as needed.

For example, if the unmanned aerial vehicle sends 30 data streams in which each of the data streams include one or more vehicles, the operator may concentrate on a single target and miss other information. Further, the rate at which data may be sent may be limited by the amount of bandwidth available for a communications link.

Therefore, it would be advantageous to have a method and apparatus that takes into account at least some of the issues discussed above, as well as possibly other issues.

SUMMARY

In one illustrative embodiment, a method for processing video data streams for an area is provided. A number of objects is identified in the area from images in the video data streams for the area. The video data streams are generated by cameras. A first number of locations is identified for the number of objects using the images in the video data streams. The first number of locations is defined using a coordinate system for the images. A number of graphical representations is formed for the number of objects using the images in the video data streams generated by the cameras. The number of graphical representations is displayed for the number of objects in a second number of locations in a model of the area on a display system with respect to a number of features in the area that is represented in the model. The second number of locations is defined using a geographic coordinate system for the model. A first location in the first number of locations for an object in the number of objects corresponds to a second location in the second number of locations for a corresponding graphical representation in the number of graphical representations.

In another illustrative embodiment, an apparatus comprises a display system and a computer system. The computer system is configured to identify a number of objects in an area from images in video data streams for the area in which the video data streams are generated by cameras. The computer system is further configured to identify a first number of locations for the number of objects. The first number of locations is defined using a coordinate system for the images. The computer system is further configured to form a number of graphical representations for the number of objects using the images in the video data streams generated by the cameras. The computer system is further configured to display the number of graphical representations for the number of objects in a second number of locations in a model of the area on a display system with respect to a number of features in the area that is represented in the model. The second number of locations is defined using a geographic coordinate system for the model and a first location in the first number of locations for an object in the number of objects that corresponds to a second location in the second number of locations for a corresponding graphical representation in the number of graphical representations.

In yet another illustrative embodiment, a computer program product comprises a computer readable storage medium, first program code, second program code, third program code, and fourth program code. The first program code is for identifying a number of objects in an area from images in video data streams for the area. The video data streams are generated by cameras. The second program code is for identifying a first number of locations for the number of objects using the images in the video data streams. The first number of locations is defined using a coordinate system for the images. The third program code is for forming a number of graphical representations for the number of objects using the images in the video data streams generated by the cameras. The fourth program code is for displaying the number of graphical representations for the number of objects in a second number of locations in a model of the area on a display system with respect to a number of features in the area that is represented in the model. The second number of locations is defined using a geographic coordinate system for the model and a first location in the first number of locations for an object in the number of objects that corresponds to a second location in the second number of locations for a corresponding graphical representation in the number of graphical representations. The first program code, the second program code, the third program code, and the fourth program code are stored on the computer readable storage medium.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIGS. 12A and 12B are illustrations of a flowchart of a process for updating a display of graphical representations in a model in accordance with an illustrative embodiment;

FIG. 14 is an illustration of a data processing system in accordance with an illustrative embodiment.

DETAILED DESCRIPTION

The different illustrative embodiments recognize and take into account a number of different considerations. "A number", as used herein with reference to objects, means one or more objects. For example, "a number of considerations" is one or more considerations.

The different illustrative embodiments recognize and take into account that one manner in which multiple video streams may be more efficiently reviewed by a human operator is by combining the video data streams. The different illustrative embodiments recognize and take into account that one manner in which the combination of video data streams may be combined is to project these video data streams onto a three-dimensional model.

The different illustrative embodiments recognize and take into account that although this type of projection may provide a single view of a particular area, the information may not be as accurate as desired or may be difficult to view. The different illustrative embodiments recognize and take into account that although the projection is on a three-dimensional model, the video data streams contain two-dimensional images.

For example, an unmanned aerial vehicle may send a video data stream containing images of a car. This car may be projected onto a model in which the car is shown in three dimensions. The different illustrative embodiments recognize and take into account that when the object in the three-dimensional model for the car is seen at different angles, information may be missing that should be present. If you look at the object from a different angle from the perspective of the camera, distortions may be present or information may not be seen that is desired for the car.

Thus, the different illustrative embodiments provide a method and apparatus for processing video data streams for an area. In one illustrative embodiment, a number of objects are identified in the area from images in the video data streams for the area. The video data streams are generated by cameras. A first number of locations is identified for the number of objects using the images in the video data streams. The first number of locations is defined using a coordinate system for the images.

A number of graphical representations is formed for the number of objects using the images in the video data streams generated by the cameras. The number of graphical representations is displayed for the number of objects in a second number of locations in a model of the area on a display system with respect to a number of features in the area that are represented in the model. The second number of locations is defined using a geographic coordinate system for the model. A first location in the first number of locations for an object in the number of objects corresponds to a second location in the second number of locations for a corresponding graphical representation in the number of graphical representations.

Figure 1:
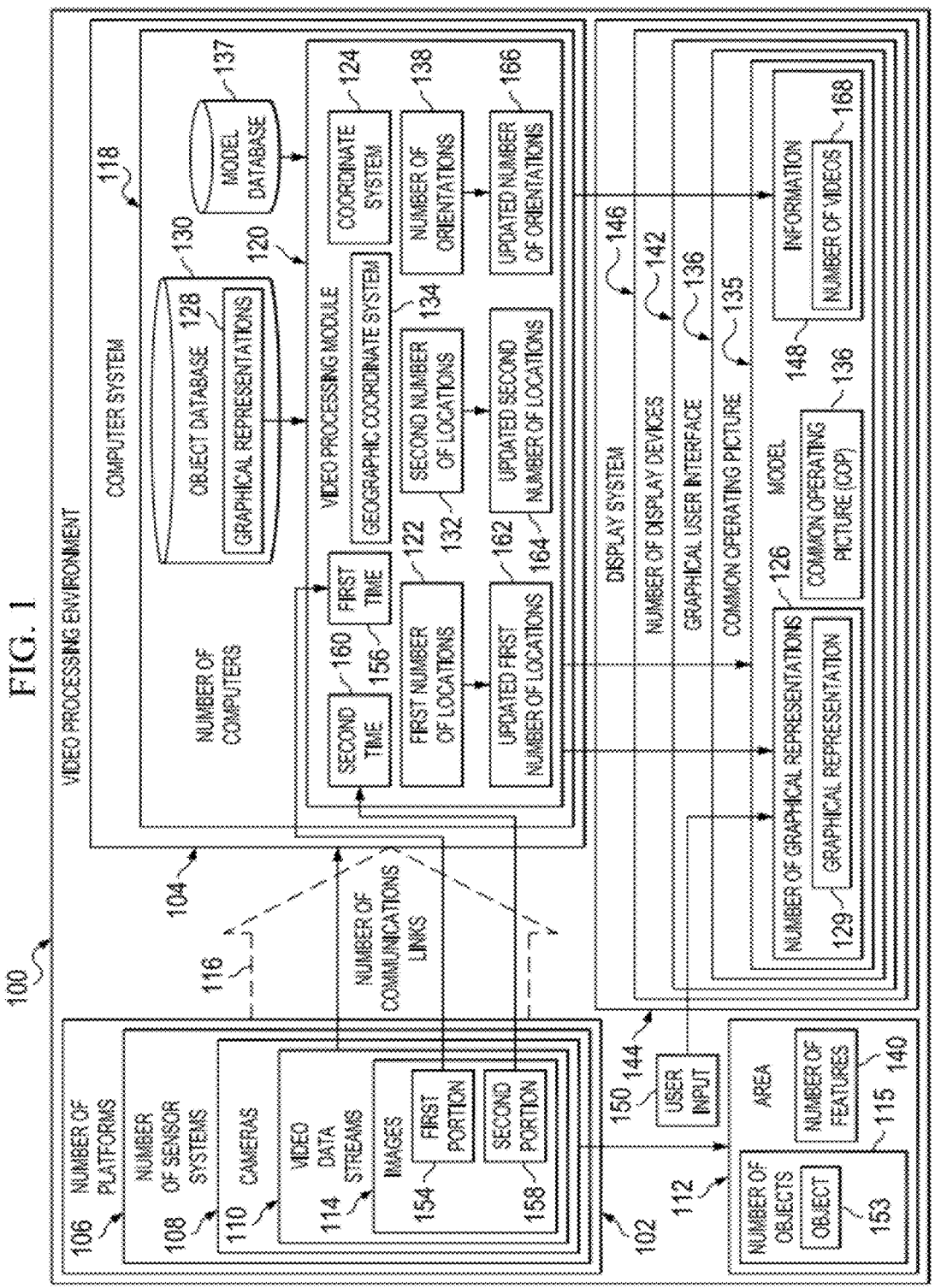
FIG. 1 is an illustration of a video processing environment in the form of a block diagram in accordance with an illustrative embodiment.

With reference now to FIG. 1, an illustration of a video processing environment in the form of a block diagram is depicted in accordance with an illustrative embodiment. In these illustrative examples, video processing environment 100 includes number of platforms 102 and computer system 104.

In these illustrative examples, number of platforms 102 may include various types of platforms. For example, a platform in number of platforms 102 may be selected from one of a mobile platform, a stationary platform, a land-based structure, an aquatic-based structure, a space-based structure, a vehicle, an aircraft, an unmanned aerial vehicle, an unmanned ground vehicle, a building, a manufacturing facility, a hospital, an object in a park, or some other suitable type of platform.

As depicted, number of platforms 102 has number of sensor systems 106. Number of sensor systems 106 comprises cameras 108. Cameras 108 may be located on a same platform or different platforms in number of platforms 102.

Cameras 108 are configured to generate video data streams 110 for area 112. Area 112 is an area in which one or more events occur. Area 112 may be, for example, a neighborhood, a city, a number of city blocks, a town, a geographic location, an area on land, an area over water, a park, and/or some other suitable type of area.

In these illustrative examples, each of video data streams 110 may be for at least a portion of area 112. For example, when area 112 is a neighborhood, a video data stream in video data streams 110 may be video of a portion of a street in the neighborhood and/or one or more houses on the portion of the street in the neighborhood.

In these illustrative examples, video data streams 110 contain images 114. These images may also be referred to as frames. Number of objects 115 may be present in images 114 of area 112. An object in number of objects 115 may be selected from one of, for example, without limitation, a vehicle, a person, a building, an aircraft, an automobile, a truck, a tank, a train, a ship, or some other suitable type of object. Number of objects 115 in area 112 may be present in one or more of images 114 in video data streams 110.

In these illustrative examples, number of platforms 102 sends video data streams 110 for area 112 to computer system 104 using number of communications links 116. Number of communications links 116 may include any number of wireless communications links, wired communications links, and/or other suitable types of communications links.

In one illustrative example, cameras 108 may be configured to send video data streams 110 directly to computer system 104 using wireless communications links in number of communications links 116. For example, cameras 108 may be wirelessly networked with computer system 104. Cameras 108 may send video data streams 110 to computer system 104 continuously, periodically, or in some other manner over time.

As depicted, computer system 104 comprises number of computers 118. Number of computers 118 may be located on one or more of number of platforms 102, at a control station, and/or in some other suitable location remote to number of platforms 102. Video processing module 120 runs on one or more of number of computers 118. Video processing module 120 may be implemented using software and/or program code in these illustrative examples.

Video processing module 120 receives video data streams 110 for area 112. Video processing module 120 identifies number of objects 115 in images 114 in video data streams 110. Further, video processing module 120 identifies first number of locations 122 in images 114 for number of objects 115.

First number of locations 122 may be defined using coordinate system 124 for images 114. Coordinate system 124 may take the form of, for example, without limitation, a Cartesian coordinate system, a polar coordinate system, a geographic coordinate system, or some other suitable type of coordinate system for identifying locations in images 114. Of course, any type of coordinate system 124 may be used to identify first number of locations 122.

Video processing module 120 forms number of graphical representations 126 for number of objects 115 using images 114. In other words, a graphical representation is formed for each of number of objects 115. A graphical representation in number of graphical representations 126 may be selected from one of, for example, without limitation, an icon, a graphical element, a symbol, a label, a shape, a picture, a two-dimensional or three-dimensional image, a two-dimensional or three-dimensional model, or some other suitable type of graphical representation.

As one illustrative example, graphical representations 128 may be stored in object database 130. Graphical representations 128 are for different types of objects. Video processing module 120 selects one or more of graphical representations 128 using images 114 to form number of graphical representations 126.

For example, video processing module 120 uses images 114 to match number of objects 115 to one or more of graphical representations 128 in object database 130. Based on a number of matches between number of objects 115 and graphical representations 128, video processing module 120 forms number of graphical representations 126.

In some illustrative examples, a graphical representation for an object in number of objects 115 may not be present in object database 130. Video processing module 120 may use images 114 to create the graphical representation for the object.

In other illustrative examples, video processing module 120 may modify a graphical representation in graphical representations 128 for an object in number of objects 115 using images 114. For example, video processing module 120 may change a color, size, label, shape, and/or some other characteristic of the graphical representation for the object based on an appearance of the object in images 114.

As depicted, video processing module 120 identifies second number of locations 132 for number of graphical representations 126. Second number of locations 132 may correspond to first number of locations 122 for number of objects 115 in these illustrative examples. For example, second number of locations 132 may be defined using geographic coordinate system 134 for model 135.

In these illustrative examples, model 135 may take the form of common operating picture (COP) 136 for area 112. As depicted in these examples, model 135 may be retrieved from model database 137. Model database 137 stores different types of models for different areas. For example, model 135 may be selected from at least one of a two-dimensional model of area 112, a three-dimensional model of area 112, a map of area 112, a number of satellite images of area 112, and other suitable visual representations of area 112 in model database 137.

As used herein, the phrase "at least one of", when used with reference to a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

Coordinate system 124 for images 114 may map to geographic coordinate system 134 for model 135. In this manner, second number of locations 132 corresponds to first number of locations 122. In other words, coordinates for first number of locations 122 may map to coordinates for second number of locations 132. Further, coordinates for second number of locations 132 may also be mapped to first number of locations 122. In other words, images 114 may be geo-registered to model 135 such that coordinates for first number of locations 122 may map to coordinates for second number of locations 132.

In these illustrative examples, geographic coordinate system 134 may use, for example, latitude, longitude, and/or altitude. In other illustrative examples, model 135 may have a different coordinate system other than geographic coordinate system 134.

Further, video processing module 120 identifies number of orientations 138 for number of graphical representations 126 using images 114. In other words, an orientation is identified for each of number of graphical representations 126 that corresponds to an orientation of the corresponding object in number of objects 115. An orientation in number of orientations 138 may include, for example, a number of angles with respect to geographic coordinate system 134 for model 135 and/or a direction of movement.

In particular, number of orientations 138 for graphical representations 128 may be identified with respect to number of features 140 in area 112 that is represented in model 135. Number of features 140 may include, for example, without limitation, roads, sidewalks, trees, buildings, structures, people, doors, doorways, windows, stairs, waterways, and/or other suitable features in area 112.

As one illustrative example, a person located at the door of a building in area 112 may be identified in images 114. An icon for the person is selected from object database 130 as the graphical representation for the person. An orientation for the graphical representation may be identified with respect to the door as the door is represented in model 135. For example, the orientation for the icon for the person may be selected as one facing away from or towards a representation of the door in model 135.

In these illustrative examples, when geographic coordinate system 134 is the same as coordinate system 124, coordinates for number of features 140 in area 112 may be the same as coordinates for number of features 140 represented in model 135. When geographic coordinate system 134 is a different coordinate system from coordinate system 124, coordinates for number of features 140 represented in model 135 map to coordinates for number of features 140 in area 112.

In these illustrative examples, video processing module 120 displays number of graphical representations 126 on model 135 of area 112 in graphical user interface 142 on display system 144. In particular, number of graphical representations 126 may be displayed on model 135 with number of orientations 138 in second number of locations 132 with respect to number of features 140 in area 112 that are represented in model 135.

As depicted, display system 144 may comprise number of display devices 146 in these illustrative examples. Number of display devices 146 may include, for example, at least one of a touch screen, a liquid crystal display (LCD), a monitor, a projection screen, and some other suitable type of display device. In some illustrative examples, display system 144 may be a holographic projection system.

In these illustrative examples, video processing module 120 may also display information 148 about number of objects 115 in association with number of graphical representations 126. Information 148 may include, for example, without limitation, at least one of a description of an object in number of objects 115, a location of the object defined by coordinate system 124, characteristics of the object identified using images 114, a number of images from images 114, and other suitable information.

As one illustrative example, user input 150 may be received selecting graphical representation 129 in number of graphical representations 126 for object 153 in number of objects 115. When graphical representation 129 is selected, information 148 is displayed in association with graphical representation 129 in graphical user interface 142.

In particular, information 148 is displayed in association with graphical representation 129 such that a viewer knows that information 148 is for graphical representation 129. For example, information 148 may be displayed in a balloon or bubble that extends from graphical representation 129. As another example, information 148 may be displayed using a color coding system such that colors for the display of information 148 match colors for graphical representation 129.

In these illustrative examples, images 114 in video data streams 110 are received by video processing module 120 over time. For example, first portion 154 of images 114 may be received at first time 156, while second portion 158 of images 114 may be received at second time 160. Second time 160 is a later time than first time 156.

Video processing module 120 uses second portion 158 of images 114 to update first number of locations 122 for number of objects 115. In this manner, video processing module 120 identifies updated first number of locations 162 for number of objects 115 using second portion 158 of images 114.

Further, video processing module 120 also identifies updated second number of locations 164 in model 135 for number of graphical representations 126 for number of objects 115 using updated first number of locations 162. Video processing module 120 may be configured to move number of graphical representations 126 from second number of locations 132 to updated second number of locations 164 in model 135 in graphical user interface 142. This movement represents movement of number of objects 115 from first number of locations 122 to updated first number of locations 162 in area 112.

Further, video processing module 120 may be configured to identify updated number of orientations 166 for number of graphical representations 126 in response to changes in the orientations for number of objects 115 in area 112. In this manner, the display of number of graphical representations 126 in model 135 in graphical user interface 142 may change with respect to number of features 140 represented in model 135.

In these illustrative examples, images 114 may be received continuously in substantially real-time by video processing module 120. Graphical representations 128 may be moved in model 135 in graphical user interface 142 in substantially real-time to represent any movement of number of objects 115 and/or changes in the orientations of number of objects 115.

In some illustrative examples, a selection of graphical representation 129 may cause information 148, in the form of number of videos 168, to be displayed in association with graphical representation 129. When the display of number of graphical representations 126 in model 135 is updated in substantially real-time, number of videos 168 may be substantially real-time videos. In other words, at least a portion of images 114 may be displayed in model 135 in association with graphical representation 129 as the images are received in substantially real-time.

In this manner, the different illustrative embodiments provide a system that allows multiple video data streams from multiple platforms to be processed at substantially the same time. With this type of processing, fewer operators may be needed to process these video data streams. Further, less time and/or effort may be required for an operator to make decisions about number of platforms 102 and/or area 112 using information 148 displayed in model 135 in graphical user interface 142.

The illustration of video processing environment 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, video data streams 110 may be generated for more than one area. For example, video processing module 120 may be configured to process video data streams 110 for other areas in addition to area 112 and display graphical representations for objects in these other areas in other models in addition to model 135.

Figure 2:
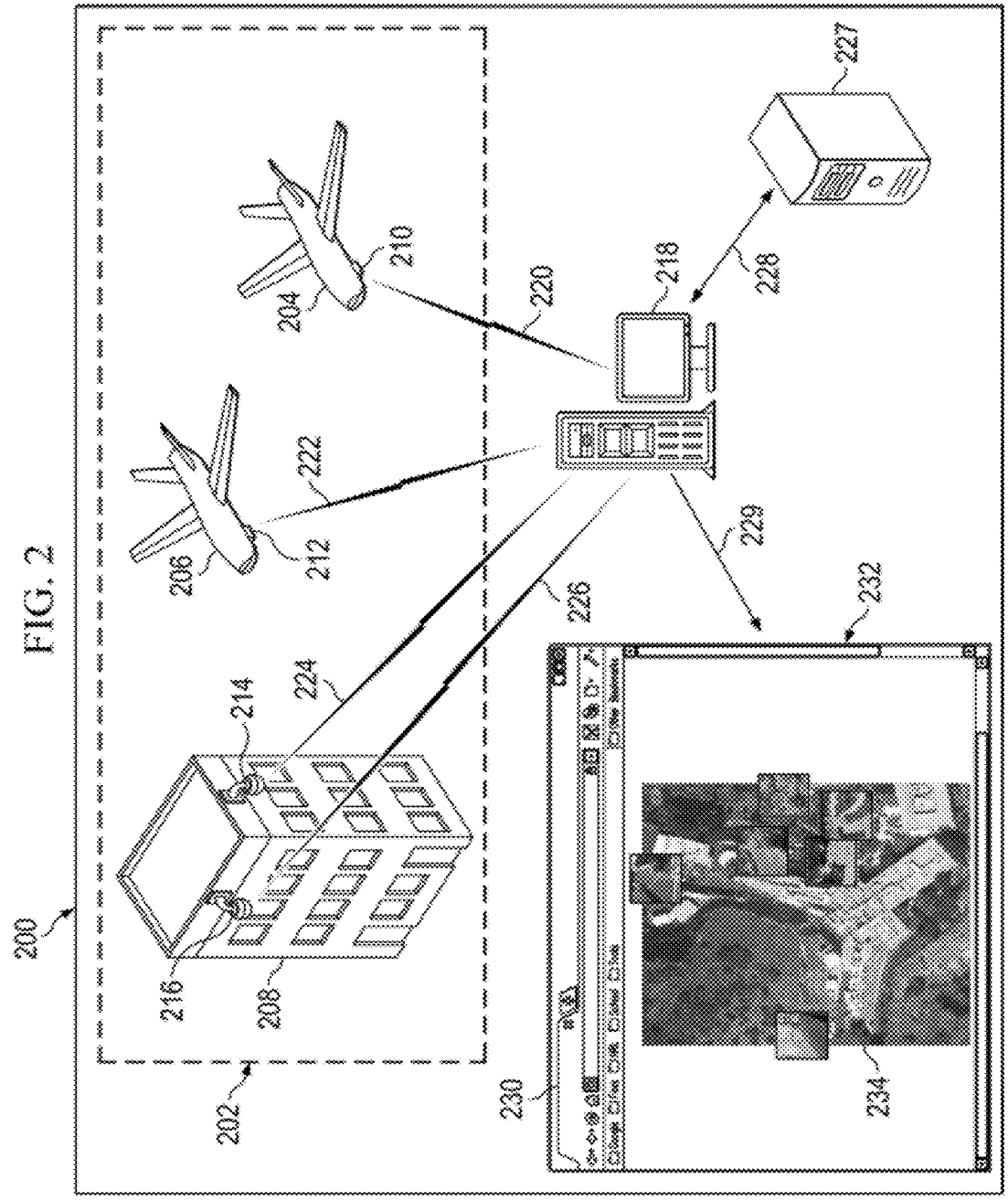
FIG. 2 is an illustration of a video processing environment in accordance with an illustrative embodiment.

With reference now to FIG. 2, an illustration of a video processing environment is depicted in accordance with an illustrative embodiment. In this illustrative example, video processing environment 200 is an example of a physical implementation for video processing environment 100 in block diagram form in FIG. 1. As depicted, video processing environment 200 includes number of platforms 202. Number of platforms 202 includes unmanned aerial vehicle 204, unmanned aerial vehicle 206, and building 208.

As depicted, unmanned aerial vehicle 204 has camera 210, unmanned aerial vehicle 206 has camera 212, and building 208 has camera 214 and camera 216. Cameras 210, 212, 214, and 216 are configured to generate video data streams for an area. In this illustrative example, cameras 210, 212, 214, and 216 send these video data streams to computer 218 using wireless communications links 220, 222, 224, and 226, respectively.

Computer 218 is an example of one implementation for one of number of computers 118 in computer system 104 in FIG. 1. Computer 218 processes the video data streams generated by the camera using information retrieved from server 227. Computer 218 is in communication with server 227 using wireless communications link 228. In this illustrative example, server 227 may store databases, such as object database 130 and model database 137 in FIG. 1.

Computer 218 uses information retrieved from server 227 using wireless communications link 228 to generate display 230 in graphical user interface 232. In particular, computer 218 displays model 234. Model 234 is a visual representation of the area for which the video data streams are generated by cameras 210, 212, 214, and 216. In this illustrative example, model 234 is a common operating picture. Model 234 may be used by an operator to view information about a number of objects in the area identified from multiple video data streams from multiple platforms.

Figure 3:
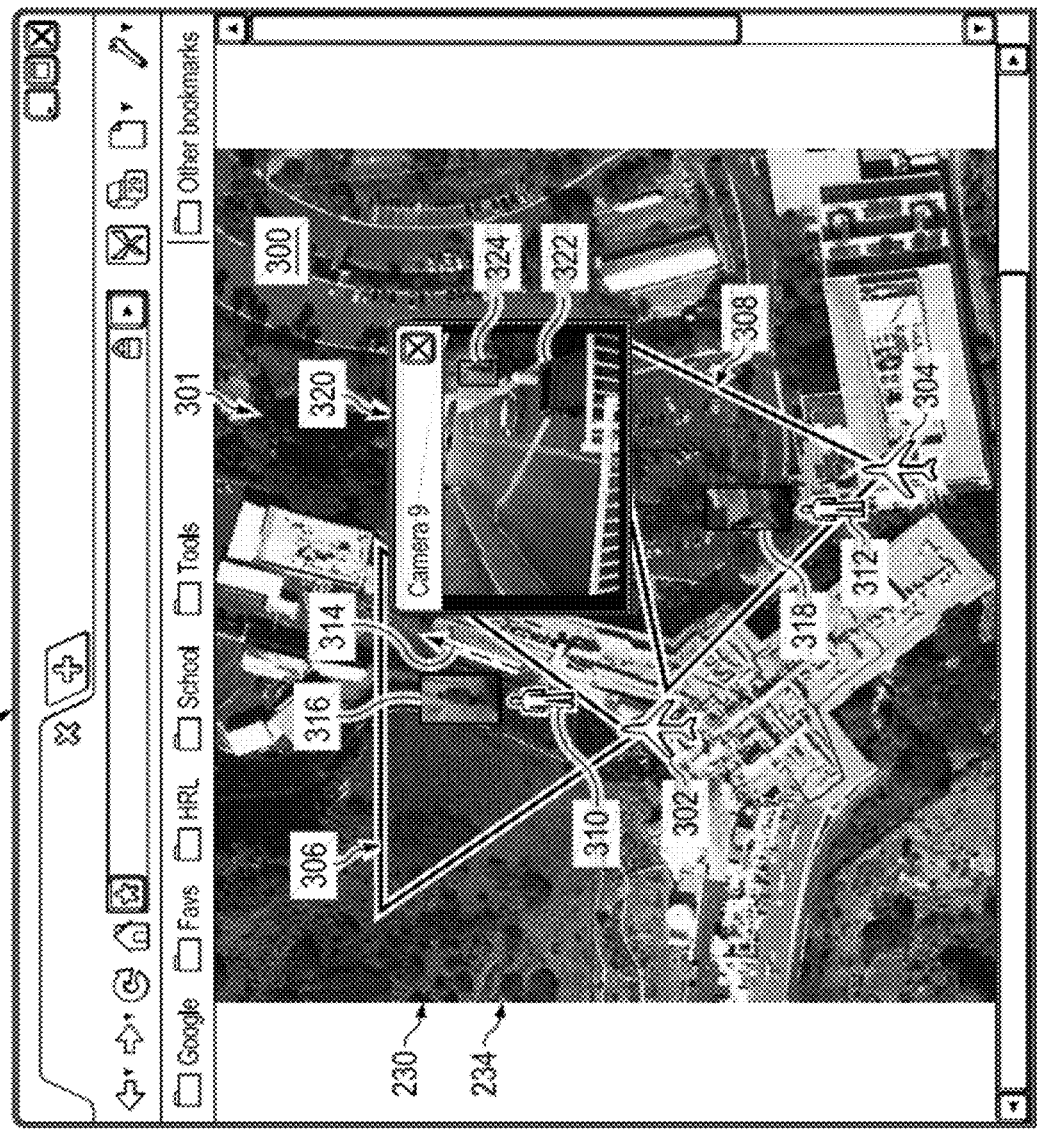
FIG. 3 is an illustration of a model for an area displayed in a graphical user interface in accordance with an illustrative embodiment.

With reference now to FIG. 3, an illustration of a model for an area displayed in a graphical user interface is depicted in accordance with an illustrative embodiment. In this illustrative example, model 234 displayed in graphical user interface 232 from FIG. 2 is depicted in greater detail. As illustrated, model 234 is satellite image 300 of area 301.

In this depicted example, aircraft icon 302 and aircraft icon 304 are displayed in model 234. Aircraft icon 302 and aircraft icon 304 are graphical representations for unmanned aerial vehicle 204 and unmanned aerial vehicle 206, respectively, from FIG. 2.

Aircraft icon 302 and aircraft icon 304 are displayed in model 234 in locations that correspond to the locations of unmanned aerial vehicle 204 and unmanned aerial vehicle 206, respectively, over area 301. Further, aircraft icon 302 and aircraft icon 304 are displayed having an orientation in model 234 that corresponds to an orientation of unmanned aerial vehicle 204 and unmanned aerial vehicle 206, respectively, over area 301.

Additionally, area 306 and area 308 are displayed in model 234. Area 306 represents a field of view for unmanned aerial vehicle 204 from FIG. 2. Area 308 represents a field of view for unmanned aerial vehicle 206 from FIG. 2.

In this illustrative example, person icon 310 is present in area 306, and person icon 312 is present in area 308. Person icon 310 represents a person identified from a video data stream received from unmanned aerial vehicle 204 in FIG. 2. Person icon 312 represents a person identified from a video data stream received from unmanned aerial vehicle 206 in FIG. 2.

As depicted, path 314 is displayed in model 234 in association with person icon 310. Path 314 is a graphical representation of an expected path for person icon 310. As depicted, path 314 has a direction that represents a direction of movement for the person represented by person icon 310.

In this illustrative example, a viewer may select person icon 310 and/or person icon 312. A selection of person icon 310 causes image 316 to be displayed in association with person icon 310. Image 316 may be, for example, a portion of an image received in the video data stream from unmanned aerial vehicle 204 in FIG. 2. Image 316 is the portion of the image in the video data stream in which the person corresponding to person icon 310 was identified.

Further, a selection of person icon 312 causes image 318 to be displayed in association with person icon 312. Image 318 may be, for example, a portion of an image received in the video data stream from unmanned aerial vehicle 206 in FIG. 2. Image 318 is the portion of the image in the video data stream in which the person corresponding to person icon 312 was identified.

In some cases, a selection of person icon 310 causes window 320 to be displayed. Window 320 displays video 322. Video 322 is a presentation of the video data stream received from unmanned aerial vehicle 204 in FIG. 2. As depicted, graphical indicator 324 is positioned over video 322 in window 320 to provide a location in video 322 for the person corresponding to person icon 310.

Figure 4:
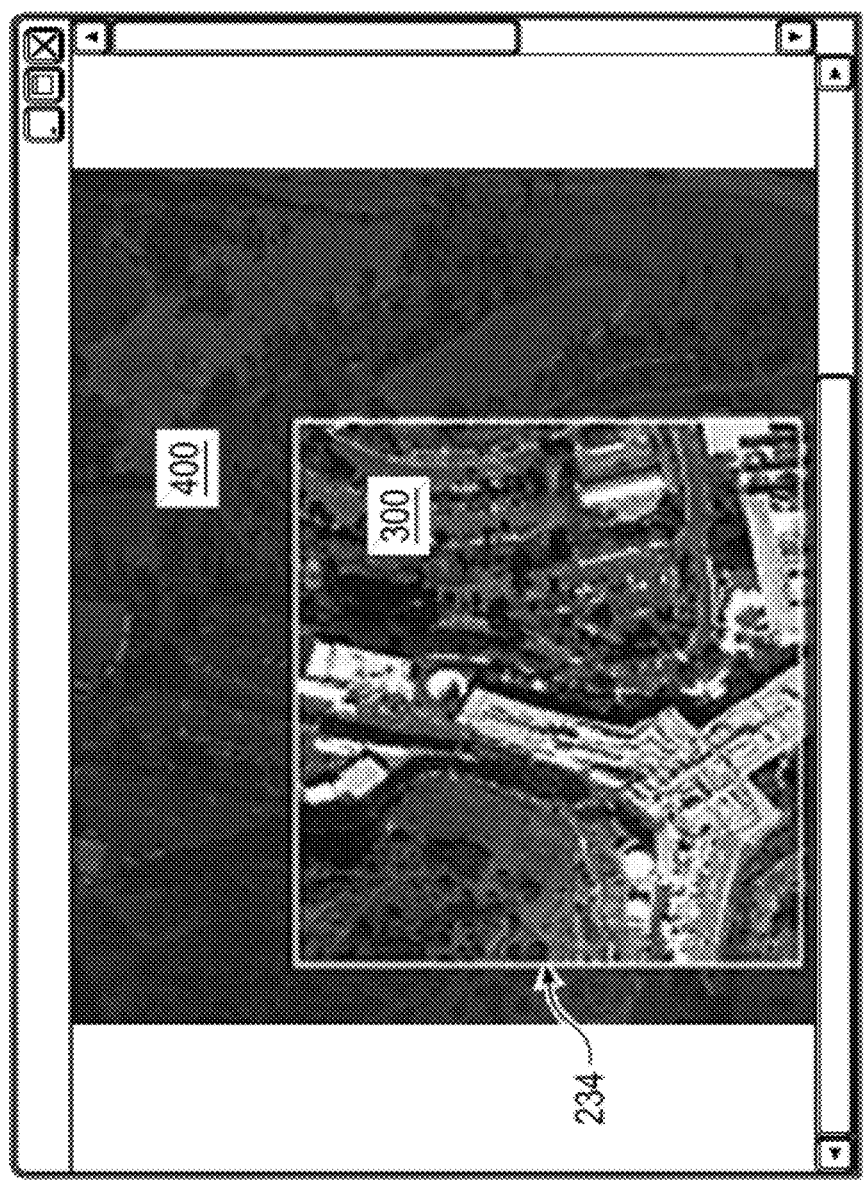
FIG. 4 is an illustration of a model for an area in accordance with an illustrative embodiment.

Turning now to FIG. 4, an illustration of a model for an area is depicted in accordance with an illustrative embodiment. As depicted in this example, only portion 400 of model 234 is displayed in graphical user interface 232 in FIGS. 2-3. Model 234 includes a representation of additional features in the area being monitored by unmanned aerial vehicle 204, unmanned aerial vehicle 206, and building 208 in FIG. 2.

Portion 400 of model 234 may be selected for display in graphical user interface 232 in FIGS. 2-3 such that only a relevant portion of the area being monitored is displayed. Further, portion 400 may be selected for display such that an enlarged view of portion 400 of model 234 may be displayed.

The illustrations of video processing environment 200 in FIG. 2 and model 234 in FIGS. 2-4 are not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, additional platforms in addition to or in place of unmanned aerial vehicle 204, unmanned aerial vehicle 206, and/or building 208 may be present in number of platforms 202 in FIG. 2. Further, additional computers in addition to computer 218 may be present in video processing environment 200 for processing the video data streams generated by the cameras for number of platforms 202.

Figure 5:
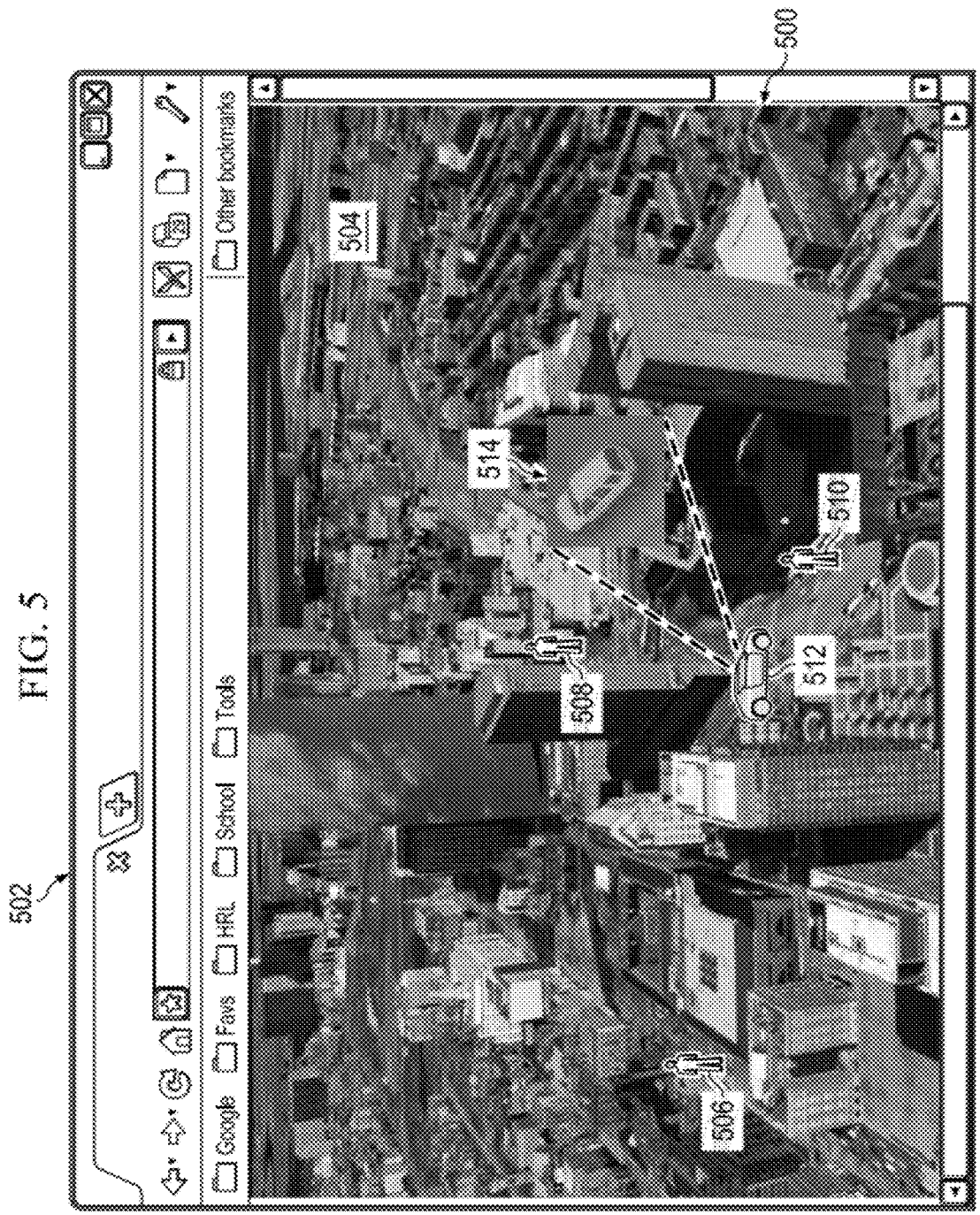
FIG. 5 is an illustration of a model displayed in a graphical user interface in accordance with an illustrative embodiment.

With reference now to FIG. 5, an illustration of a model displayed in a graphical user interface is depicted in accordance with an illustrative embodiment. In this illustrative example, model 500 displayed in graphical user interface 502 is an example of one implementation for model 135 displayed in graphical user interface 142 in FIG. 1.

As depicted, model 500 takes the form of common operating picture 504. Graphical representations 506, 508, 510, and 512 are displayed in model 500. These graphical representations represent objects identified in images of an area represented by model 500. The locations of these graphical representations may be updated in substantially real-time as the images of the area are received in substantially real-time.

In one illustrative example, a selection of graphical representation 512 causes image 514 to be displayed. In this manner, a viewer may see the actual object represented by graphical representation 512.

Figure 6:
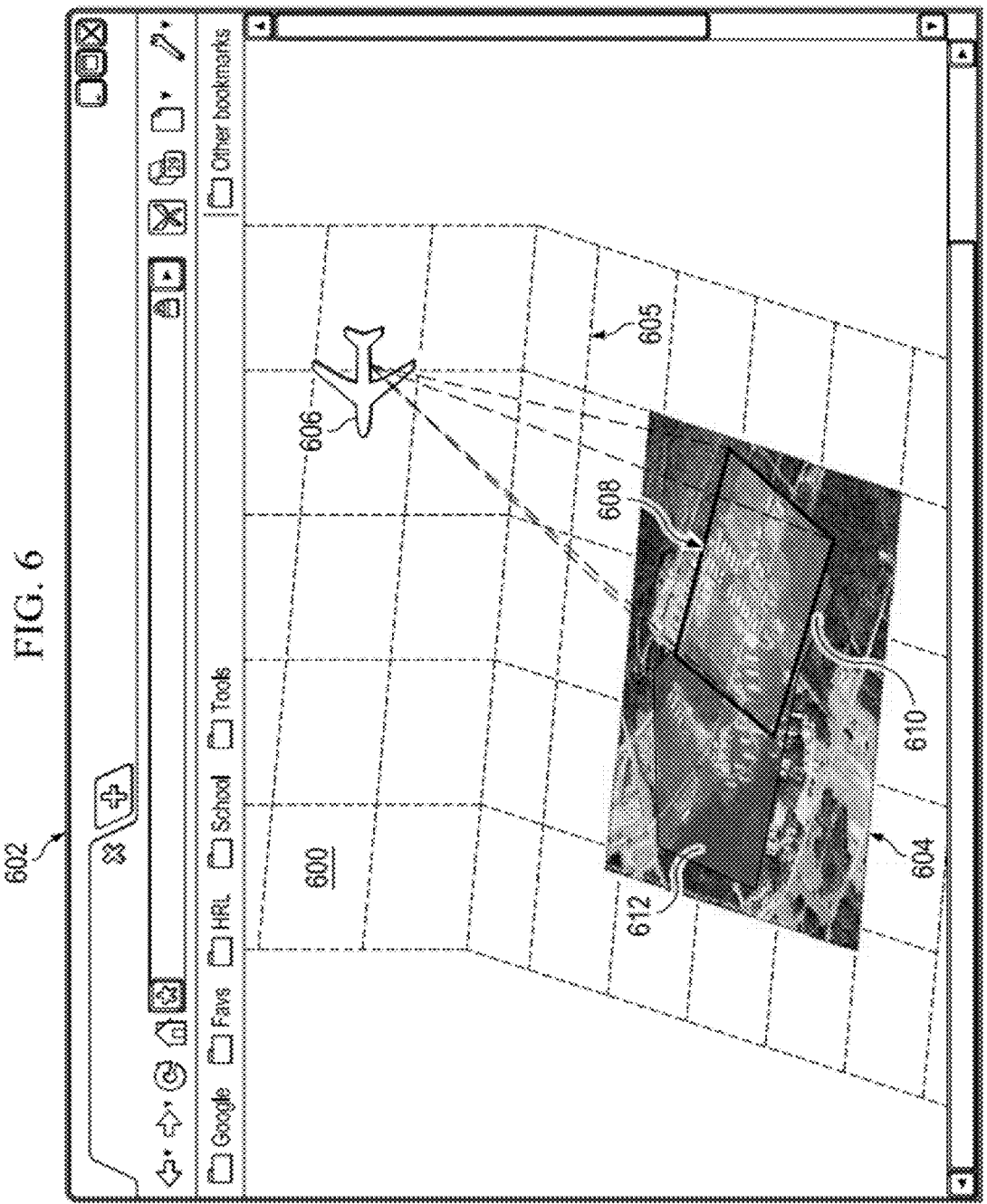
FIG. 6 is an illustration of another model displayed in a graphical user interface in accordance with an illustrative embodiment.

Turning now to FIG. 6, an illustration of another model displayed in a graphical user interface is depicted in accordance with an illustrative embodiment. In this illustrative example, model 600 displayed in graphical user interface 602 is another example of one implementation for model 135 displayed in graphical user interface 142 in FIG. 1.

As depicted, model 600 is a three-dimensional model. In particular, satellite image 604 of an area represented by model 600 is displayed with respect to grid 605 representing three-dimensional space in model 600. In this illustrative example, aircraft icon 606 is displayed with respect to grid 605 in a location relative to satellite image 604.

Aircraft icon 606 represents an unmanned aerial vehicle that generates images for the area represented by model 600. In this depicted example, the location and orientation for aircraft icon 606 in model 600 represents the location and orientation of the unmanned aerial vehicle with respect to the area represented by model 600.

Area 608 represents different fields of view for the unmanned aerial vehicle over time. For example, area 610 represents the field of view for the unmanned aerial vehicle at a first time at which an image was taken by the unmanned aerial vehicle. Area 612 represents the field of view for the unmanned aerial vehicle at a later time at which the image was taken by the unmanned aerial vehicle. In this manner, the unmanned aerial vehicle generates images over time as the unmanned aerial vehicle moves over the area represented by model 600.

Figure 7:
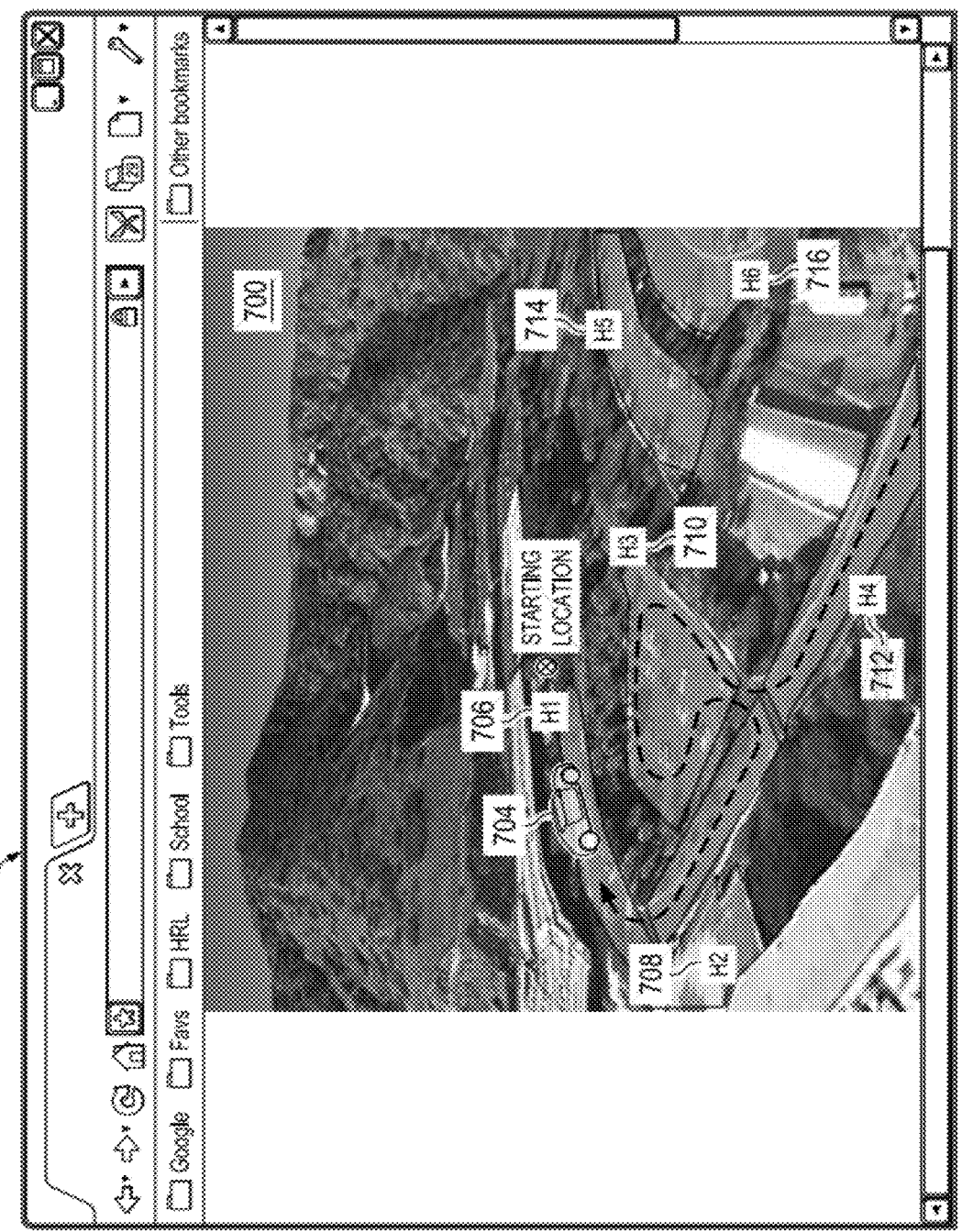
FIG. 7 is an illustration of a graphical representation for an object displayed in a model displayed in a graphical user interface in accordance with an illustrative embodiment.

Turning now to FIG. 7, an illustration of a graphical representation for an object displayed in a model displayed in a graphical user interface is depicted in accordance with an illustrative embodiment. In this illustrative example, a method is provided for geo-registering images taken by a plurality of stationary cameras to model 700. As depicted, model 700, M, is displayed in graphical user interface 702. Graphical representation 704 is for an object identified in an image generated by a stationary camera on, for example, a roof of a building or on the side of a tower.

In particular, the plurality of stationary cameras generate a set of images, $I_0$, $I_1$, $I_2$, . . . , and $I_n$, in which n is the total number of cameras. Geo-registering the images onto model 700 may be performed using homography. Homography is the mapping of one coordinate space to another coordinate space.

For example, $H_{i,M}$ denotes the homography mapping function that maps $I_i$, an $i_{th}$ image in the sequence of images, to M, model 700. In this example, $H_{i,M}I_i = M_i$, where $M_i$ is the area in or portion of model 700 where $I_i$ projects to in model 700. $H_{i,M}I_i$ may be referred to as a homography mapping. In this illustrative example, areas 706, 708, 710, 712, 714, and 716 are the areas in model 700 to which images may be projected using homography mappings $H_{1,M}I_i$ through $H_{6,M}I_6$. Each area where the same homography mapping function is used is referred to as H1 through H6, respectively, in FIG. 7.

Figure 8:
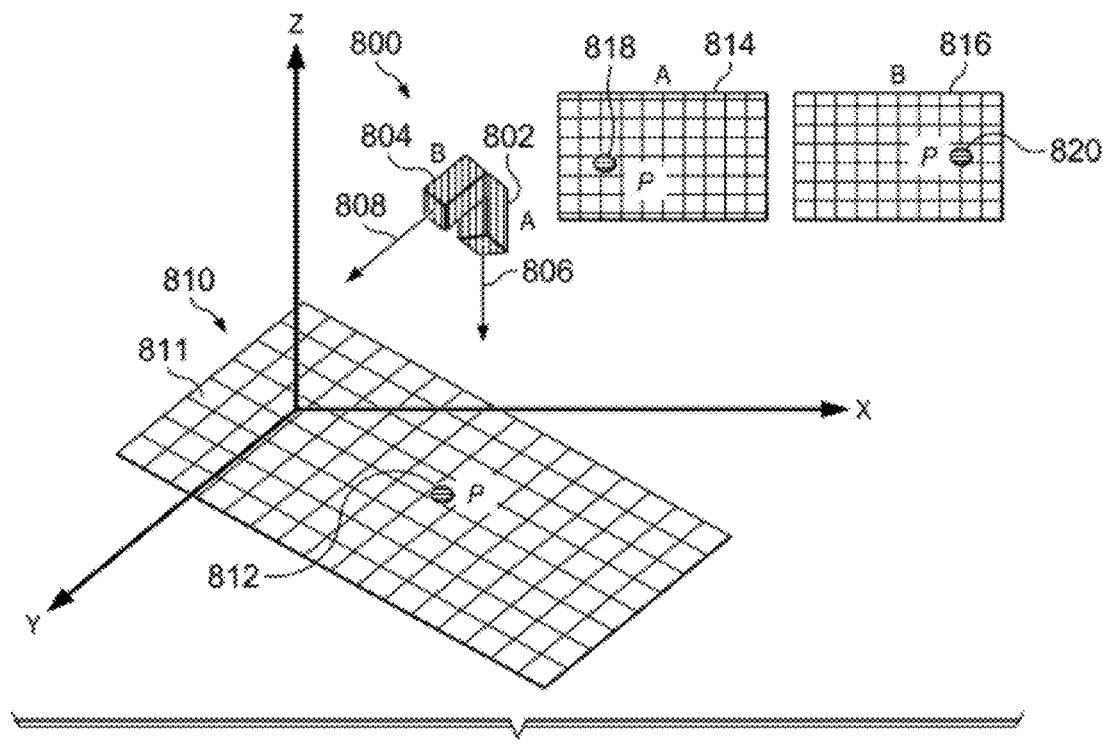
FIG. 8 is an illustration of a three-dimensional space in a model in accordance with an illustrative embodiment.

With reference now to FIG. 8, an illustration of a three-dimensional space in a model is depicted in accordance with an illustrative embodiment. In this illustrative example, a method is provided for geo-registering images taken by cameras that can pan and/or tilt.

As one illustrative example, a line of sight for camera 800 may be changed when camera 800 rotates. Camera 800 may rotate by panning and/or tilting. As one illustrative example, camera 800 rotates from position 802 to position 804. In position 802, camera 800 has line of sight 806. Camera 800 has line of sight 808 when in position 804.

Model 810 represents a model of an area for which images are generated by camera 800. Three-dimensional surface 811 in model 810 represents an uneven ground surface for a ground for which images are taken by camera 800. Location 812 in model 810 represents an actual location of an object of interest.

This object of interest is in different locations in image 814 generated by camera 800 in position 802 and in image 816 generated by camera 800 in position 804. For example, the object of interest has location 818 in image 814 and location 820 in image 816.

As camera 800 rotates using panning and/or tilting, any coordinate for a location on the ground in an image generated by camera 800 may be mapped to a corresponding coordinate in model 810 using camera back projection. The coordinates for locations on the ground in the image may be calculated using extrinsic parameters and/or intrinsic parameters for camera 800, as well as information on where a line of sight from camera 800 intersects with the ground surface given the angle of rotation for camera 800. This information may be pre-calculated for all possible camera angles relative to the ground surface.

Extrinsic parameters may include, for example, an amount of translation, an angle of rotation, and/or other suitable parameters for camera 800. Intrinsic parameters may include, for example, a focal length, a lens distortion, and/or other suitable parameters for camera 800.

In this illustrative example, camera back projection maps a two-dimensional point in a camera image to a corresponding three-dimensional point in model 810.

Figure 9:
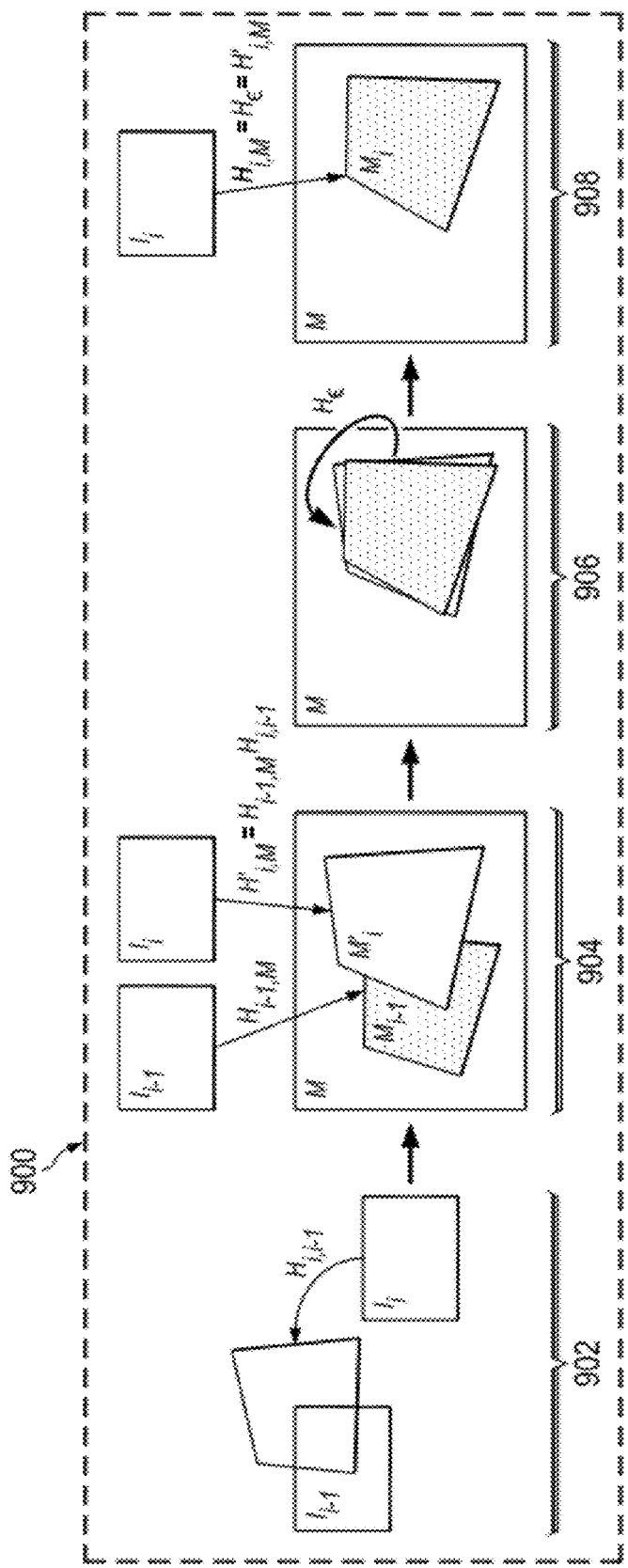
FIG. 9 is an illustration of a technique for identifying locations for displaying graphical representations in a model in accordance with an illustrative embodiment.

With reference now to FIG. 9, an illustration of a technique for identifying locations for displaying graphical representations in a model is depicted in accordance with an illustrative embodiment. In this illustrative example, technique 900 includes steps 902, 904, 906, and 908. These steps are performed for each image generated by a camera that can rotate and/or move to different positions, such as, for example, a camera on an unmanned aerial vehicle.

In step 902, a current image in a sequence of images, $I_i$, may be registered with a previous image in the sequence of images, $I_{i-1}$, to obtain the homography mapping function, $H_{i,i-1}$. The current image and the previous image are consecutive images in a sequence of images generated by the camera.

In step 902, the homography mapping function may be obtained by matching features in the two images and then using a random sample consensus (RANSAC) algorithm to perform outlier filtering. The features matched are scale invariant feature transform (SIFT) features. These features do not vary when an image is scaled and/or rotated. The features may be matched using nearest neighbor matching techniques.

In step 904, the homography mapping function, $H_{i,M}$, for mapping the current image to the model is estimated using the homography mapping function identified for the previous image and the homography mapping function obtained in step 902. In particular, $$H'_{i,M} = H_{i-1,M} H_{i,i-1},$$

where $H'_{i,M}$ is an estimation for $H_{i,M}$, and $H_{i-1,M}$ is the homography mapping function for the previous image.

Further, in step 904, the estimated homography mapping function warps current image, $I_i$, to a partial local mosaic, $M'_i$, in the model. In other words, $M'_i$ is the warped image of $I_i$ by $H'_{I,M}$. In particular, $$M'_i = H'_{i,M} I_i.$$

In step 906, the area, $M'_i$, is registered to the model at area, $M_i$, to obtain $H_e$, which is the homography mapping function needed to register $M'_i$ to the model at $M_i$ such that the current image is accurately registered to the model. The area, $M_i$, is the area in the model to which the current image is projected. For example, if the model is a satellite image, $M_i$ is the area on the satellite image that corresponds to the area in the current image. In this illustrative example, $M_i = H_e M'_i$.

Further, in step 908, the homography mapping function that registers the current image, $I_i$, to $M_i$ in the model, is derived as $H_{i,M} = H_e H'_{i,M}$. In this manner, the sequence of images generated by the camera may be registered to different areas in the model.

Figure 10:
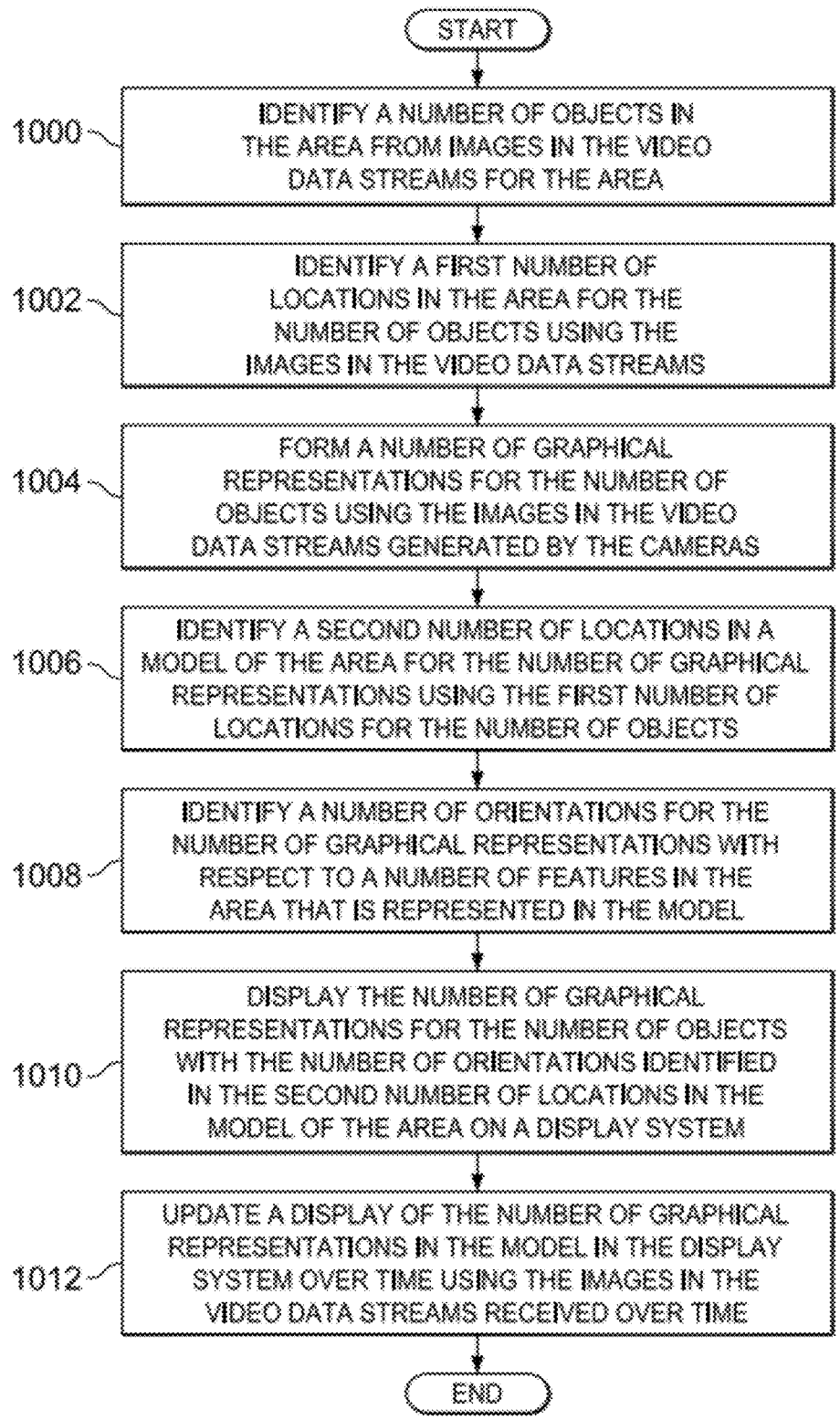
FIG. 10 is an illustration of a flowchart of a process for processing video data streams for an area depicted in accordance with an illustrative embodiment.

With reference now to FIG. 10, an illustration of a flowchart of a process for processing video data streams for an area is depicted in accordance with an illustrative embodiment. The process illustrated in FIG. 10 may be implemented using video processing module 120 in video processing environment 100 in FIG. 1.

The process begins by identifying a number of objects in the area from images in the video data streams for the area (operation 1000). The video data streams are generated by cameras. The cameras may be on a number of platforms, such as, for example, unmanned vehicles, manned vehicles, structures, and/or other suitable types of platforms. In operation 1000, the number of objects is a number of objects of interest. In other words, the number of objects may include objects for which additional information and/or tracking is desired.

The process then identifies a first number of locations in the area for the number of objects using the images in the video data streams (operation 1002). The first number of locations may be defined using a coordinate system for the images.

Next, the process forms a number of graphical representations for the number of objects using the images in the video data streams generated by the cameras (operation 1004). In operation 1004, the number of graphical representations may be selected from, for example, object database 130 in FIG. 1.

The process then identifies a second number of locations in a model of the area for the number of graphical representations using the first number of locations for the number of objects (operation 1006). The second number of locations may be defined by a geographic coordinate system for the model of the area. The geographic coordinate system may use, for example, latitude, longitude, and/or altitude.

In this illustrative example, the coordinate system for the area in the images may map to the geographic coordinate system for the model. For example, a first location in the first number of locations for an object in the number of objects corresponds to a second location in the second number of locations for a corresponding graphical representation in the number of graphical representations.

Thereafter, the process identifies a number of orientations for the number of graphical representations with respect to a number of features in the area that is represented in the model (operation 1008). In operation 1008, an orientation for a graphical representation for an object corresponds to an actual orientation of the object in the area with respect to the number of features in the area.

Next, the process displays the number of graphical representations for the number of objects with the number of orientations identified in the second number of locations in the model of the area on a display system (operation 1010). In this manner, in operation 1010, the number of graphical representations may be displayed in the model with respect to the number of features in the area that is represented in the model.

Then, the process updates a display of the number of graphical representations in the model in the display system over time using the images in the video data streams received over time (operation 1012), with the process terminating thereafter.

Figure 11:
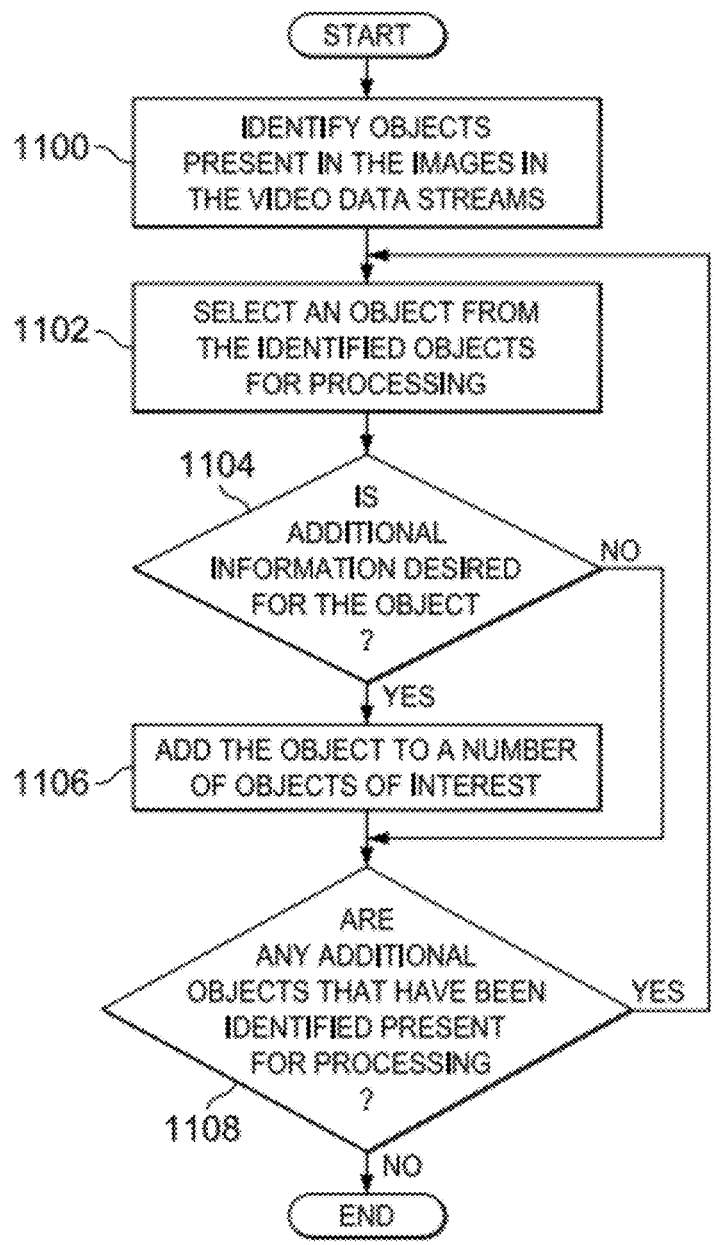
FIG. 11 is an illustration of a flowchart of a process for identifying a number of objects in an area from images in video data streams for the area in accordance with an illustrative embodiment.

With reference now to FIG. 11, an illustration of a flowchart of a process for identifying a number of objects in an area from images in video data streams for the area is depicted in accordance with an illustrative embodiment. The process illustrated in FIG. 11 may be implemented using video processing module 120 in video processing environment 100 in FIG. 1. Further, this process may be used to implement operation 1000 in FIG. 10.

The process begins by identifying objects present in the images in the video data streams (operation 1100). The process then selects an object from the identified objects for processing (operation 1102).

Thereafter, the process determines whether additional information is desired for the object (operation 1104). The additional information may be, for example, data tracking movement of the object, a description of the object, and/or other suitable information about the object. If additional information is desired for the object, the process adds the object to a number of objects of interest (operation 1106).

The process then determines whether any additional objects that have been identified are present for processing (operation 1108). If additional objects are not present for processing, the process terminates. Otherwise, the process returns to operation 1102 as described above.

With reference again to operation 1104, if additional information is not desired for the object, the process proceeds to operation 1108 as described above. In this manner, not all of the objects present in the images may be selected as objects of interest. Only objects of interest may be represented by graphical representations in the model displayed on the display system in operation 1010 in FIG. 10.

Figure 12A:
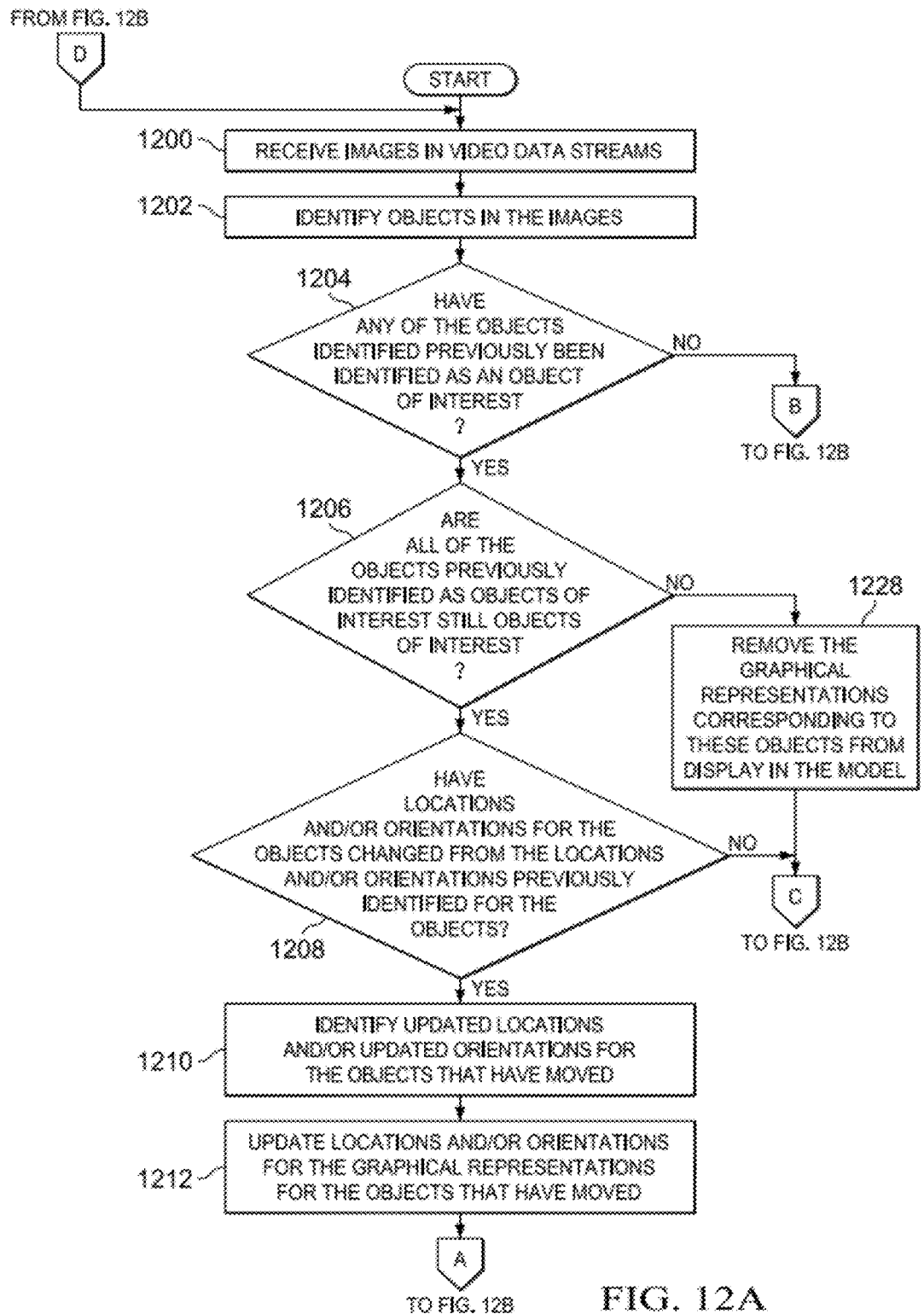

Turning now to FIGS. 12A and 12B, illustrations of a flowchart of a process for updating a display of graphical representations in a model is depicted in accordance with an illustrative embodiment. The process illustrated in FIG. 11 may be implemented using video processing module 120 in video processing environment 100 in FIG. 1. Further, this process may be used to implement operation 1012 in FIG. 10.

The process begins by receiving images in video data streams (operation 1200). These images may be received at a later time than the time at which initial images from which an initial number of objects of interest is identified. The process identifies objects in the images (operation 1202). Then, the process determines whether any of the objects identified have previously been identified as an object of interest (operation 1204).

If any of the objects have previously been identified as objects of interest, the process determines whether all of the objects previously identified as objects of interest are still objects of interest (operation 1206). If all of the objects previously identified are still objects of interest, the process determines whether any locations and/or orientations for the objects that are still objects of interest have changed from the locations and/or orientations previously identified for the objects (operation 1208).

If any locations and/or orientations for the objects that are still objects of interest have changed from the locations and/or orientations previously identified for the objects, the process identifies updated locations and/or updated orientations for the objects that have moved (operation 1210). Thereafter, the process updates locations and/or orientations for the graphical representations for the objects that have moved (operation 1212).

Next, the process moves the graphical representations corresponding to the objects that have moved to the updated locations for the graphical representations (operation 1214). Thereafter, the process determines whether any additional objects in the objects identified from the images are present for processing (operation 1215). If additional objects are present for processing, the process determines whether the objects are new objects of interest (operation 1216).

If none of the objects identified are new objects of interest, the process determines whether any additional images are to be received (operation 1218). If additional images are not to be received, the process terminates. Otherwise, the process returns to operation 1200 as described above.

With reference again to operation 1216, if any objects from the objects identified from the images are new objects of interest, the process adds these objects to the number of objects of interest (operation 1220). The process then identifies locations for the new objects of interest (operation 1222). The process identifies graphical representations for the new objects of interest and locations and orientations for the graphical representations (operation 1224). Thereafter, the process displays the graphical representations for the new objects of interest in the model (operation 1226). The process then proceeds to operation 1218 as described above.

Further, with reference again to operation 1215, if additional objects are not present for processing, the process proceeds to operation 1218 as described above.

With reference again to operation 1208, if the locations and/or orientations for the objects have not changed from the locations and/or orientations previously identified for the objects, the process proceeds to operation 1215 as described above.

Still further, with reference again to operation 1206, if any of the previously identified objects are no longer objects of interest, the process removes the graphical representations corresponding to these objects from display in the model (operation 1228). The process then proceeds to operation 1215 as described above.

With reference again to operation 1204, if none of the objects identified in the images have been previously identified as objects of interest, the process proceeds to operation 1216 as described above.

Figure 13:
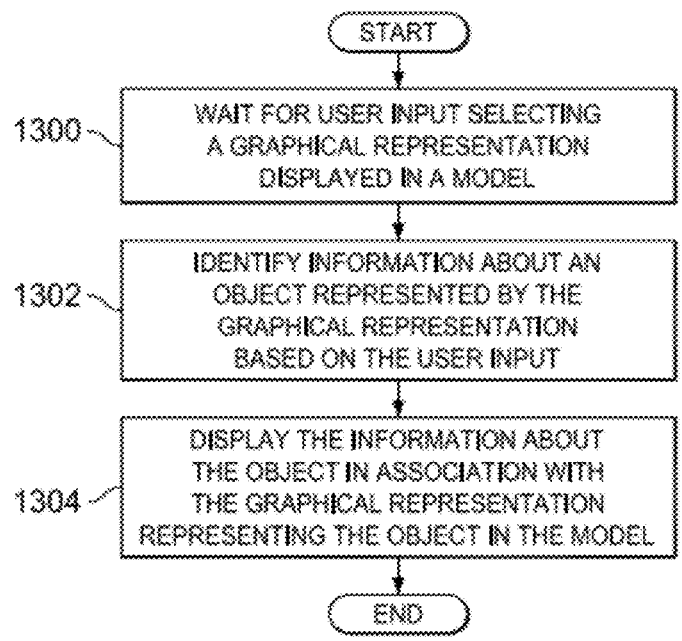
FIG. 13 is an illustration of a flowchart of a process for displaying information in association with a graphical representation in a model in accordance with an illustrative embodiment.

Turning now to FIG. 13, an illustration of a flowchart of a process for displaying information in association with a graphical representation in a model is depicted in accordance with an illustrative embodiment. The process illustrated in FIG. 13 may be implemented using video processing module 120 in video processing environment 100 in FIG. 1.

The process begins by waiting for user input selecting a graphical representation displayed in a model (operation 1300). As one illustrative example, user input may be received that selects a car icon in a model. The car icon may have a color indicating a color for the car it represents.

The process then identifies information about an object represented by the graphical representation based on the user input (operation 1302). In operation 1302, the information may be, for example, real-time video of the object, a description of the object, an identification of the object, a listing of features for the object, an image of the object, and/or other suitable types of information. For example, when the car icon is selected, the process may identify a make and/or model for the car represented by the car icon.

Thereafter, the process displays the information about the object in association with the graphical representation representing the object in the model (operation 1304), with the process terminating thereafter. For example, a balloon with text identifying the make and/or model of the car may be displayed extending from the car icon.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Turning now to FIG. 14, an illustration of a data processing system is depicted in accordance with an illustrative embodiment. In this illustrative example, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. Processor unit 1404 may be a number of processors, a multi-processor core, or some other type of processor, depending on the particular implementation. A number, as used herein with reference to an item, means one or more items. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426.

Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer readable storage media 1424 may not be removable from data processing system 1400.

In these examples, computer readable storage media 1424 is a physical or tangible storage device used to store program code 1418 rather than a medium that propagates or transmits program code 1418. Computer readable storage media 1424 is also referred to as a computer readable tangible storage device or a computer readable physical storage device. In other words, computer readable storage media 1424 is a media that can be touched by a person.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1418 may be omitted, because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1406, or a cache, such as found in an interface and memory controller hub that may be present in communications fabric 1402.

Thus, the different illustrative embodiments provide a method and apparatus for processing video data streams for an area. In one illustrative embodiment, a number of objects is identified in the area from images in the video data streams for the area. The video data streams are generated by cameras. A first number of locations is identified for the number of objects using the images in the video data streams. The first number of locations is defined using a coordinate system for the images.

A number of graphical representations is formed for the number of objects using the images in the video data streams generated by the cameras. The number of graphical representations is displayed for the number of objects in a second number of locations in a model of the area on a display system with respect to a number of features in the area that is represented in the model. The second number of locations is defined using a geographic coordinate system for the model. A first location in the first number of locations for an object in the number of objects corresponds to a second location in the second number of locations for a corresponding graphical representation in the number of graphical representations.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the use contemplated.

What is claimed is:

1. A method for processing video data streams for an area, the method comprising:
    identifying a number of objects in the area from images in the video data streams for the area, wherein the number of objects includes an unmanned aerial vehicle and wherein the video data streams are generated by cameras;
    identifying a first number of locations for the number of objects using the images in the video data streams, wherein the first number of locations is defined using a coordinate system for the images;
    forming a number of graphical representations for the number of objects using the images in the video data streams generated by the cameras, wherein the number of graphical representations includes an aircraft icon corresponding to the unmanned aerial vehicle;
    displaying the number of graphical representations for the number of objects in a second number of locations in a model of the area on a display system with respect to a number of features in the area that is represented in the model, wherein the model comprises a satellite image of the area, the aircraft icon is displayed having an orientation in the model that corresponds to an orientation of the unmanned aerial vehicle over the area, the second number of locations is defined using a geographic coordinate system for the model, and a first location in the first number of locations for an object in the number of objects corresponds to a second location in the second number of locations for a corresponding graphical representation in the number of graphical representations;
    displaying a second area in the model, the second area representing a field of view for the unmanned aerial vehicle, wherein a selection of a graphical representation of the graphical representations causes an image to be displayed in association with the graphical representation, the image is a portion of an image received in a video data stream of the video data streams in which an object corresponding to the graphical representation was identified, the number of graphical representations further includes a person icon present in the second area, and the person icon represents a person identified from the video data stream received from the unmanned aerial vehicle; and
    displaying a path in the model in association with the person icon, wherein the path is one of the number of graphical representations and is an expected path for the person icon, the path has a direction that represents a direction of movement for the person represented by the person icon, the selection of the graphical representation of the person icon causes a window to be displayed in association with the person icon, the image is displayed in the window and comprises a video that is a presentation of the video data stream received from the unmanned aerial vehicle in which the person was identified, and a graphical indicator is positioned over the video in the window to provide a location in the video for the person corresponding to person icon.

2. The method of claim 1 further comprising:
    identifying the second number of locations in the model of the area that correspond to the first number of locations for the number of objects.

3. The method of claim 1 further comprising:
    identifying a number of orientations for the number of objects using the images in the video data streams; and
    wherein the step of displaying the number of graphical representations for the number of objects in the second number of locations in the model of the area on the display system with respect to the number of features in the area that is represented in the model comprises:

displaying the number of graphical representations for the number of objects in the second number of locations in the model of the area on the display system with the number of orientations with respect to the number of features in the area that is represented in the model.

4. The method of claim 3, wherein the step of displaying the number of graphical representations for the number of objects in the second number of locations in the model of the area on the display system with respect to the number of features in the area that is represented in the model further comprises:
displaying information about the number of objects in association with the number of graphical representations for the number of objects.

5. The method of claim 1, wherein the first number of locations is identified from a first portion of the images in the video data streams generated at a first time and further comprising:
updating the first number of locations for the number of objects using a second portion of the images in the video data streams that are generated at a second time that is later than the first time to form an updated first number of locations;
identifying an updated second number of locations in the model of the area using the updated first number of locations; and
displaying the number of graphical representations for the number of objects in the updated second number of locations in the model of the area on the display system with respect to the number of features in the area that is represented in the model, wherein the number of graphical representations for the number of objects move in the model in a manner that represents movement of the number of objects in the area.

6. The method of claim 1, wherein the model is selected from at least one of a two-dimensional model of the area, a three-dimensional model of the area, a map, and a satellite image.

7. The method of claim 1 further comprising:
receiving the video data streams for the area from a number of platforms, wherein a platform in the number of platforms is selected from one of a mobile platform, a stationary platform, a land-based structure, an aquatic-based structure, a space-based structure, a vehicle, an aircraft, an unmanned aerial vehicle, and an unmanned ground vehicle.

8. The method of claim 1 further comprising:
displaying a number of videos containing the object in the number of objects in response to a user input selecting a graphical representation in the number of graphical representations for the object in the model.

9. The method of claim 1, wherein the model is a common operating picture for the area.

10. The method of claim 1, wherein the object in the number of objects is selected from one of a vehicle, a person, a building, an aircraft, an automobile, a truck, a tank, a train, and a ship.

11. An apparatus comprising:
a display system; and
a computer system configured to:
identify a number of objects in an area from images in video data streams for the area in which the video data streams are generated by cameras, wherein the number of objects includes an unmanned aerial vehicle;
identify a first number of locations for the number of objects, wherein the first number of locations is defined using a coordinate system for the images;
form a number of graphical representations for the number of objects using the images in the video data streams generated by the cameras, wherein the number of graphical representations includes an aircraft icon corresponding to the unmanned aerial vehicle;
display the number of graphical representations for the number of objects in a second number of locations in a model of the area on a display system with respect to a number of features in the area that is represented in the model, wherein the model comprises a satellite image of the area and wherein the aircraft icon is displayed having an orientation in the model that corresponds to an orientation of the unmanned aerial vehicle over the area, wherein the second number of locations is defined using a geographic coordinate system for the model and a first location in the first number of locations for an object in the number of objects that corresponds to a second location in the second number of locations for a corresponding graphical representation in the number of graphical representations;
display a second area in the model, the second area representing a field of view for the unmanned aerial vehicle, wherein a selection of a graphical representation of the graphical representations causes an image to be displayed in association with the graphical representation, the image is a portion of an image received in a video data stream of the video data streams in which an object corresponding to the graphical representation was identified, the number of graphical representations further includes a person icon present in the second area, and the person icon represents a person identified from the video data stream received from the unmanned aerial vehicle; and
display a path in the model in association with the person icon, wherein the path is one of the number of graphical representations and is an expected path for the person icon, the path has a direction that represents a direction of movement for the person represented by the person icon, the selection of the graphical representation of the person icon causes a window to be displayed in association with the person icon, the image is displayed in the window and comprises a video that is a presentation of the video data stream received from the unmanned aerial vehicle in which the person was identified, and a graphical indicator is positioned over the video in the window to provide a location in the video for the person corresponding to person icon.

12. The apparatus of claim 11, wherein the computer system is further configured to identify the second number of locations in the model of the area that corresponds to the first number of locations for the number of objects.

13. The apparatus of claim 11, wherein the computer system is further configured to identify a number of orientations for the number of objects using the images in the video data streams; and wherein in being configured to display the number of graphical representations for the number of objects in the second number of locations in the model of the area on the display system with respect to the number of features in the area that is represented in the model, the computer system is configured to display the number of graphical representations for the number of objects in the second number of locations in the model of the area on the display system with the number of orientations with respect to the number of features in the area that is represented in the model.

14. The apparatus of claim 13, wherein in being configured to display the number of graphical representations for the number of objects in the second number of locations in the model of the area on the display system with respect to the number of features in the area that is represented in the model, the computer system is configured to display information about the number of objects in association with the number of graphical representations for the number of objects.

15. The apparatus of claim 11, wherein the first number of locations is identified from a first portion of the images in the video data streams generated at a first time, and wherein the computer system is further configured to update the first number of locations for the number of objects using a second portion of the images in the video data streams that is generated at a second time that is later than the first time to form an updated first number of locations; identify an updated second number of locations in the model of the area using the updated first number of locations; and display the number of graphical representations for the number of objects in the updated second number of locations in the model of the area on the display system with respect to the number of features in the area that is represented in the model, wherein the number of graphical representations for the number of objects move in the model in a manner that represents movement of the number of objects in the area.

16. The apparatus of claim 11, wherein the model is selected from at least one of a two-dimensional model of the area, a three-dimensional model of the area, a map, and a satellite image.

17. The apparatus of claim 11, wherein the computer system is further configured to receive the video data streams for the area from a number of platforms, wherein a platform in the number of platforms is selected from one of a mobile platform, a stationary platform, a land-based structure, an aquatic-based structure, a space-based structure, a vehicle, an aircraft, an unmanned aerial vehicle, and an unmanned ground vehicle.

18. The apparatus of claim 11, wherein the computer system is further configured to display a number of videos containing the object in the number of objects in response to a user input selecting a graphical representation in the number of graphical representations for the object in the model.

19. A computer program product comprising:
a non-transitory computer readable storage medium;
first program code for identifying a number of objects in an area from images in video data streams for the area, wherein the number of objects includes an unmanned aerial vehicle, wherein the video data streams are generated by cameras;
second program code for identifying a first number of locations for the number of objects using the images in the video data streams, wherein the first number of locations is defined using a coordinate system for the images;
third program code for forming a number of graphical representations for the number of objects using the images in the video data streams generated by the cameras, wherein the number of graphical representations includes an aircraft icon corresponding to the unmanned aerial vehicle;
fourth program code for displaying the number of graphical representations for the number of objects in a second number of locations in a model of the area on a display system with respect to a number of features in the area that is represented in the model, wherein the model comprises a satellite image of the area and wherein the aircraft icon is displayed having an orientation in the model that corresponds to an orientation of the unmanned aerial vehicle over the area, wherein the second number of locations is defined using a geographic coordinate system for the model and a first location in the first number of locations for an object in the number of objects that corresponds to a second location in the second number of locations for a corresponding graphical representation in the number of graphical representations;
fifth program code for displaying a second area in the model, the second area representing a field of view for the unmanned aerial vehicle, wherein a selection of a graphical representation of the graphical representations causes an image to be displayed in association with the graphical representation, the image is a portion of an image received in a video data stream of the video data streams in which an object corresponding to the graphical representation was identified, the number of graphical representations further includes a person icon present in the second area, and the person icon represents a person identified from the video data stream received from the unmanned aerial vehicle; and
sixth program code for displaying a path in the model in association with the person icon, wherein the path is one of the number of graphical representations and is an expected path for the person icon, the path has a direction that represents a direction of movement for the person represented by the person icon, the selection of the graphical representation of the person icon causes a window to be displayed in association with the person icon, the image is displayed in the window and comprises a video that is a presentation of the video data stream received from the unmanned aerial vehicle in which the person was identified, and a graphical indicator is positioned over the video in the window to provide a location in the video for the person corresponding to person icon;
wherein the first program code, the second program code, the third program code, the fourth program code, the fifth program code, and the sixth program code are stored on the non-transitory computer readable storage medium.

20. The computer program product of claim 19 further comprising:
seventh program code for identifying a number of orientations for the number of objects using the images in the video data streams, and
eighth program code for displaying the number of graphical representations for the number of objects in the second number of locations in the model of the area on the display system with the number of orientations with respect to the number of features in the area that is represented in the model;
wherein the seventh program code and the eighth program code are stored on the non-transitory computer readable storage medium.

* * * * *

UNITED STATES PATENT AND TRADEMARK OFFICE
CERTIFICATE OF CORRECTION

PATENT NO. : 9,746,988 B2
APPLICATION NO. : 13/113295
DATED : August 29, 2017
INVENTOR(S) : Kyungnam Kim et al.

It is certified that error appears in the above-identified patent and that said Letters Patent is hereby corrected as shown below:

In the Claims

Column 20, Line 55, after "to" insert --the--.
Column 22, Line 52, after "to" insert --the--.
Column 24, Line 45, after "to" insert --the--.

Signed and Sealed this
Seventeenth Day of October, 2017

Joseph Matal
*Performing the Functions and Duties of the
Under Secretary of Commerce for Intellectual Property and
Director of the United States Patent and Trademark Office*